(12) United States Patent
Lee et al.

(10) Patent No.: US 9,717,003 B2
(45) Date of Patent: Jul. 25, 2017

(54) SPONSORED CONNECTIVITY TO CELLULAR NETWORKS USING EXISTING CREDENTIALS

(71) Applicant: QUALCOMM Incorporated, San Diego, CA (US)

(72) Inventors: Soo Bum Lee, San Diego, CA (US); Anand Palanigounder, San Diego, CA (US); Gavin Bernard Horn, La Jolla, CA (US)

(*) Notice: Subject to any disclaimer, the term of this patent is extended or adjusted under 35 U.S.C. 154(b) by 0 days.

(21) Appl. No.: 14/817,123

(22) Filed: Aug. 3, 2015

(65) Prior Publication Data

US 2016/0262021 A1 Sep. 8, 2016

Related U.S. Application Data

(60) Provisional application No. 62/129,462, filed on Mar. 6, 2015.

(51) Int. Cl.
| | |
|---|---|
| *H04M 1/66* | (2006.01) |
| *H04W 12/06* | (2009.01) |
| *H04L 29/06* | (2006.01) |

(52) U.S. Cl.
CPC .......... *H04W 12/06* (2013.01); *H04L 63/083* (2013.01); *H04L 63/0807* (2013.01); *H04L 63/18* (2013.01)

(58) Field of Classification Search
CPC ..... H04W 12/16; H04W 8/245; H04W 12/02; H04M 1/72519; H04L 63/0815
USPC .......... 455/411, 550.1, 418; 380/270; 726/8
See application file for complete search history.

(56) References Cited

U.S. PATENT DOCUMENTS

| 8,594,628 B1 | 11/2013 | Schroeder et al. | |
| 8,776,214 B1* | 7/2014 | Johansson | H04L 63/0823 713/170 |
| 2008/0060066 A1* | 3/2008 | Wynn | H04L 61/2015 726/6 |
| 2012/0039323 A1* | 2/2012 | Hirano | H04W 36/385 370/338 |

(Continued)

OTHER PUBLICATIONS

Pashalidis A., et al., "Using GSM/UMTS for Single Sign-On," IEEE, 2003, pp. 138-145.

(Continued)

*Primary Examiner* — Danh Le
(74) *Attorney, Agent, or Firm* — Qualcomm IP Dept.; James Hunt Yancey, Jr.

(57) ABSTRACT

Systems and techniques are disclosed to facilitate the sponsored connectivity of a user equipment on a serving network so that the UE may access a service whose connectivity is sponsored by an application service provider. The application service provider provisions the serving network so that it is aware of the sponsored connectivity. In an attach attempt to the serving network, the UE provides a client token based on a pre-existing credential (established between the UE and the application service provider) instead of a subscriber identifier with the attach request. The application service provider's server validates the access credential to authenticate the UE and provides information that the serving network uses to mutually authenticate with the UE. The UE may then use the serving network to access the service via the sponsored connection, even where the UE does not have a subscriber identity and subscription with a cellular network.

27 Claims, 11 Drawing Sheets

(56) References Cited

U.S. PATENT DOCUMENTS

| | | | |
|---|---|---|---|
| 2013/0013923 A1 | 1/2013 | Thomas et al. | |
| 2013/0298209 A1 | 11/2013 | Targali et al. | |
| 2013/0316674 A1 | 11/2013 | Cho et al. | |
| 2014/0082715 A1* | 3/2014 | Grajek | H04L 63/0815 726/8 |
| 2014/0226817 A1* | 8/2014 | Von Huben | H04L 61/35 380/270 |
| 2014/0308918 A1 | 10/2014 | Lee et al. | |
| 2014/0370846 A1 | 12/2014 | Neal | |
| 2016/0066004 A1* | 3/2016 | Lieu | H04N 21/2541 725/29 |
| 2016/0119228 A1* | 4/2016 | Gao | H04L 47/2408 370/392 |

OTHER PUBLICATIONS

3GPP: "Policy and Charging Control Architecture (Release 11), 3GPP TS 23.203 V11:15.0", Technical Specification Group Services and System Aspects, Dec. 5, 2014 (Dec. 5, 2014), XP050926874, [retrieved on Dec. 5, 2014] 6.2.1 Policy Control and Charging Rules Function (PCRF) 6.2.3 Application Function (AF) Annex N; PCC usage for sponsored data connectivity.

3GPP: "Study on Policy solutions and Enhancements (Release 11), 3GPP TR 23.813 V11.0.0" Technical Specification Group Services and System Aspects, Jun. 10, 2011 (Jun. 10, 2011), XP050552994, [retrieved on Jun. 10, 2011] 4.1 Key Issue 1: Policy enhancement for sponsored data connectivity.

International Search Report and Written Opinion—PCT/US2016/018855—ISA/EPO—Jun. 6, 2016.

\* cited by examiner

SPONSORED CONNECTIVITY TO CELLULAR NETWORKS USING EXISTING CREDENTIALS

CROSS REFERENCE TO RELATED APPLICATIONS & PRIORITY CLAIM

The present application claims priority to and the benefit of U.S. Provisional Patent Application No. 62/129,462, filed Mar. 6, 2015, entitled "Sponsored Connectivity to Cellular Networks Using Existing Credentials," the disclosure of which is incorporated by reference herein in its entirety.

TECHNICAL FIELD

This application relates generally to wireless communication systems, and more particularly to an application service provider sponsoring access over a serving network to one or more services. Certain embodiments enable and provide devices, methods, and systems capable of and/or configured for accessing network application services in scenarios where users may lack network subscription(s) in a manner that is scalable, secure, and trackable (e.g., for billing/metering purposes).

INTRODUCTION

To receive services from a network, an unknown user equipment (UE) needs to register with the network or otherwise become known to the network. This is accomplished using a network attach procedure. Generally, a UE that does not have a subscription for service is not able to attach to a serving network to receive voice or data service (aside from emergency service, such as 911 in the United States for example). Attempts have been made to enable a UE to still receive service by sponsoring connectivity of the UE to the serving network. Sponsored connectivity typically involves limited allowance of network access to a specific application or service that is sponsored by the specific application or service.

Current conventional approaches exclude certain types of devices (e.g., UEs without SIM cards and/or subscriptions) from being able to take advantage of sponsored connectivity and are inefficient or expose the serving network to undesired (or malicious) traffic on its core network. As discussed below, aspects and embodiments of this disclosure are aimed at enhancing sponsored connectivity.

BRIEF SUMMARY OF SELECT EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for accessing a service includes identifying, by a user equipment (UE), a serving network through which an application service provider server sponsors access to the service; sending, from the UE, an attach request to the serving network with a client token based on a pre-existing credential established with the application service provider server, the client token being unrecognizable as a cellular access credential to the serving network; and authenticating, by the UE, to the serving network via the application service provider server for sponsored access to the service based on the pre-existing credential.

In an additional aspect of the disclosure, a method for enabling access to a sponsored service by an application service provider server includes receiving, from an intervening serving network through which the application service provider server sponsors access to the service, an authentication information request based on an attach request from a user equipment (UE), the authentication information request comprising a client token based on a pre-existing credential established with the application service provider server and being unrecognizable as a cellular access credential to the serving network; determining, by the application service provider server, authentication information based on the pre-existing credential accessible by the application service provider server in response to the authentication information request; and transmitting, from the application service provider server, the authentication information in a response to the serving network, wherein the authentication information assists in authentication between the UE and the serving network for sponsored access to the service based on the pre-existing credential.

In an additional aspect of the disclosure, a user equipment (UE) for accessing a service includes a transceiver configured to: assist in identifying a serving network through which an application service provider server sponsors access to the service; and send an attach request to the serving network with a client token based on a pre-existing credential established with the application service provider server, the client token being unrecognizable as a cellular access credential to the serving network; and a processor configured to authenticate to the serving network via the application service provider server for sponsored access to the service based on the pre-existing credential.

In an additional aspect of the disclosure, an application service provider server that sponsors access to a service includes a transceiver configured to receive, from an intervening serving network through which the application service provider server sponsors access to the service, an authentication information request based on an attach request from a user equipment (UE), the authentication information request comprising a client token based on a pre-existing credential established with the application service provider server and being unrecognizable as a cellular access credential to the serving network; and a processor configured to determine authentication information based on the pre-existing credential accessible by the application service provider server in response to the authentication information request, wherein the transceiver is further configured to transmit the authentication information in a response to the serving network, and wherein the authentication information assists in authentication between the UE and the serving network for sponsored access to the service based on the pre-existing credential.

In an additional aspect of the disclosure, a computer-readable medium having program code recorded thereon includes program code comprising code for causing a user equipment (UE) to identify a serving network through which an application service provider server sponsors access to a service; code for causing the UE to send an attach request to the serving network with a client token based on a pre-existing credential established with the application service provider server, the client token being unrecognizable as a cellular access credential to the serving network; and code for causing the UE to authenticate to the serving network via the application service provider server for sponsored access to the service based on the pre-existing credential.

In an additional aspect of the disclosure, a computer-readable medium having program code recorded thereon includes program code comprising code for causing an application service provider server to receive, from an intervening serving network through which the application service provider server sponsors access to a service, an authentication information request based on an attach request from a user equipment (UE), the authentication information request comprising a client token based on a pre-existing credential established with the application service provider server and being unrecognizable as a cellular access credential to the serving network; code for causing the application service provider server to determine authentication information based on the pre-existing credential accessible by the application service provider server in response to the authentication information request; and code for causing the application service provider server to transmit the authentication information in a response to the serving network, wherein the authentication information assists in authentication between the UE and the serving network for sponsored access to the service based on the pre-existing credential.

In an additional aspect of the disclosure, a user equipment (UE) for accessing a service includes means for identifying a serving network through which an application service provider server sponsors access to the service; means for sending an attach request to the serving network with a client token based on a pre-existing credential established with the application service provider server, the client token being unrecognizable as a cellular access credential to the serving network; and means for authenticating to the serving network via the application service provider server for sponsored access to the service based on the pre-existing credential.

In an additional aspect of the disclosure, an application service provider server that sponsors access to a service includes means for receiving, from an intervening serving network through which the application service provider server sponsors access to the service, an authentication information request based on an attach request from a user equipment (UE), the authentication information request comprising a client token based on a pre-existing credential established with the application service provider server and being unrecognizable as a cellular access credential to the serving network; means for determining authentication information based on the pre-existing credential accessible by the application service provider server in response to the authentication information request; and means for transmitting the authentication information in a response to the serving network, wherein the authentication information assists in authentication between the UE and the serving network for sponsored access to the service based on the pre-existing credential.

Other aspects, features, and embodiments of the present disclosure will become apparent to those of ordinary skill in the art upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
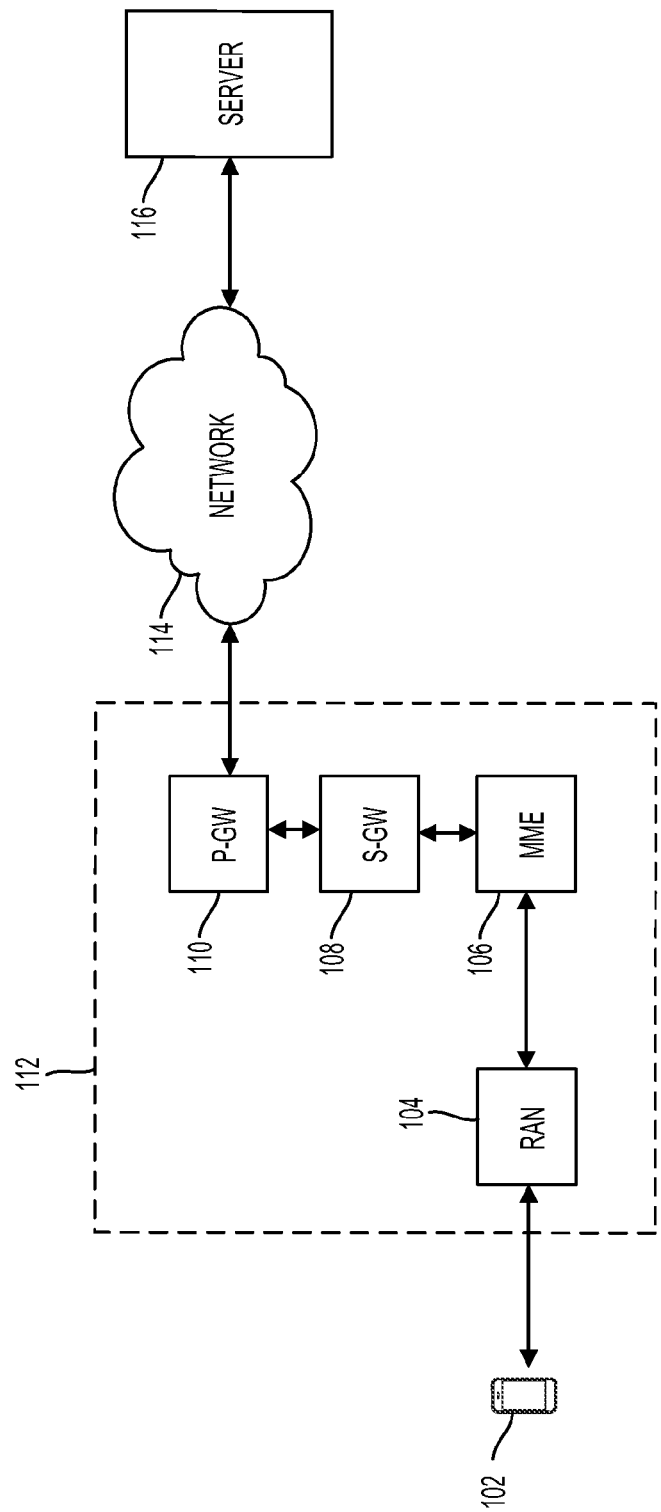
FIG. 1 illustrates a wireless communication network in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network. Embodiments of this disclosure are directed to any type of modulation scheme that may be used on any one or more of the above-recited networks and/or those yet to be developed.

Embodiments of the present disclosure introduce systems and techniques to facilitate sponsored connectivity of a user equipment (UE) on a serving network (e.g., a core network such as an evolved packet core (EPC) network).

One example of sponsored connectivity is access point name (APN)-based forwarding. In APN-based forwarding, a UE has a SIM card that has been configured with an APN by a sponsoring application service provider (e.g., an online marketplace, etc.). The UE sends data traffic to a serving network, and the serving network enforces a rule at a public data network (PDN) gateway in an external network based on subscription profile information provided from the information configured in the UE's SIM card. APN-based forwarding is therefore limited in that it cannot be used for UEs that do not have SIM cards and/or that do not have a cellular subscription. The generic bootstrapping architecture (GBA) is similarly limited because it also presupposes a current subscription and SIM capability.

Another example of sponsored connectivity is application-based forwarding. This is where the serving network filters data traffic from a UE based on an internet protocol (IP) destination addresses of individual data packets from the UE. This may work in scenarios where UEs do not have SIM capability or a subscription, but is subject to several other drawbacks. Application-based forwarding allows unauthenticated and/or unauthorized data traffic to flow through the serving network's core network. This may be exploited by an attacker to overload the service access network (such as a gateway) with excess requests/traffic that cannot all be handled by the gateway, which might still be charged to the sponsoring application/service. Application-based forwarding is most often inefficient since the serving network must scan the data traffic and determine whether it is intended toward a sponsoring recipient. This scenario may also make application-based forwarding difficult to scale to many different sponsors and/or users.

The facilitation of sponsored connectivity according to aspects of the present disclosure can enable in certain scenarios a UE that may access one or more services by the server of the application service provider sponsoring the connectivity (e.g., on an external network to the EPC network). The entity sponsoring the service through the server can provision the serving network prior to an attach attempt by the UE. This provisioning may take the form of a service-level agreement between the operator of the serving network and the operator of the server. After provisioning, the serving network is able to advertise the sponsored connectivity to potentially interested users.

In an embodiment, a UE can attempt to attach to a serving network after discovering a sponsored connectivity via the serving network. As part of the attach request, the UE provides a client token (or some other client-based information) that is based on a pre-existing credential established between the UE and the application service provider to the serving network instead of a subscriber identifier. For example, the UE may not be provisioned with any operator/service provider credentials (e.g., because the UE does not have a SIM card and/or does not have a subscription to a home or cellular network). The pre-existing credential may not be a cellular network specific credential. Indeed, it may be associated with an application service provider that does not operate a cellular network (e.g., a content provider). The serving network can forward the attach request on to the server of the sponsoring entity. The attach request can include an identifier of the serving network. In an embodiment, the server of the sponsoring entity is in a network external to the serving network's core network (e.g. as accessed via a PDN-gateway as described further below). The server may generate a new shared secret key between the UE and the server via a multi-way handshake, or alternatively may use a hashed form of the user's password. As one example, a pre-existing credential can be a hashed version of a pre-existing password established between the UE and the server. Use of a new shared secret key enables generation of one or more elements of an authentication vector.

A server can then send the authentication vector to the serving network to continue facilitating network access. One or more network elements can extract and store aspects from the authentication vector (e.g., an expected response from the UE and $K_{ASME}$) and then forward on the rest (e.g., including a random number and an authentication token) to the UE as part of an authentication request. The UE uses the shared secret key or alternatively the same pre-existing credential, such as a hashed form of the user's password, to generate a response to the authentication request. This data can then be sent back to the serving network for verification. If the response from the UE matches an expected response designated by the server, then the attach procedure continues. When continued, the UE is able to utilize the serving network to access the service by virtue of the sponsored connection, even where the UE does not have a subscriber identity and/or subscription with a service provider.

In an alternative embodiment, a UE may use another authentication approach to take advantage of sponsored connectivity. The UE may attempt to attach to a serving network but not include a client token that is based on a pre-existing credential with the attach request. For example, after the serving network forwards an authentication request to the server, the server communicates with the UE via the serving network to authenticate the UE and receive authorization for the server to grant one or more network elements of the serving network to access a user profile associated with the user of the UE to complete authentication and attachment. If the UE authenticates successfully with the server (e.g., by way of a pre-existing credential or some derivative thereof), the server will then interact with a network entity in the serving network to provide an authorization code to the network element (instead of to the UE and then to the network element). The authorization code enables the network element to obtain an access token that can then be used by the network element to access the user profile associated with the UE to complete authentication and attach the UE to the serving network under the terms of the sponsorship.

Turning now to the figures, FIG. 1 illustrates a wireless communication network 100 in accordance with various aspects of the present disclosure. The wireless communication network 100 may include a number of UEs 102, as well as a number of radio access networks (RAN) 104 (where each may include any number of base stations). A single UE 102 and single RAN 104 have been illustrated in FIG. 1 for simplicity of illustration and explanation. A given base station in a RAN 104 may include an evolved Node B (eNodeB). A base station may also be referred to as a base transceiver station or an access point. Although embodiments are discussed herein generally at times with reference to LTE/4G networks, this is done for exemplary purposes. Embodiments of the present disclosure are also applicable and operable with a number of other networks.

The RAN 104 communicates with the UE 102 as shown. A UE 102 may communicate with the RAN 104 via an uplink and a downlink. The downlink (or forward link) refers to the communication link from a base station in the RAN 104 to the UE 102. The uplink (or reverse link) refers to the communication link from the UE 102 to the base station in the RAN 104.

UEs 102 may be dispersed throughout the wireless network 100, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, entertainment device, wearable communication device, a vehicular component, mobile computing device, health monitoring device, medical device, internet of things/everything devices, M2M/D2D devices, etc. The wireless communication network 100 is one example of a network to which various aspects of the disclosure apply.

Also illustrated in FIG. 1 is a mobility management entity (MME) 106. The MME 106 may be in charge of control plane functions related to subscribers (e.g., UE 102) and session management. For example, the MME 106 may provide mobility session management as well as support for handovers to other networks, roaming, and subscriber authentication. The MME 106 may assist in selection of a serving gateway (S-GW) 108 during an initial attach of the UE 102, non-access stratum (NAS) signaling, NAS signaling security, packet data network gateway (P-GW) 110 selection, bearer management functions including dedicated bearer establishment, lawful interception of signaling traffic, and other functions to name just a few examples. The RAN 104, MME 106, S-GW 108, and P-GW 110 may be in the same serving network 112 (e.g., part of an evolved packet core (EPC)). As will be recognized, the serving network 112 includes other network elements that are not shown in FIG. 1 for simplicity of discussion of aspects of the present disclosure.

The MME 106 communicates with the S-GW 108 in the serving network 112. The S-GW 108 may be the gateway that terminates the interface towards the RAN 104, assist in inter-base station handover, provide mobility anchoring for mobility between different standards (e.g., 2G, 3G, 4G, LTE, 5G and future networks, etc.), lawful interception, packet-based routing and forwarding, and accounting for inter-operator charging to name just a few examples. The S-GW 108 routes and forwards data packets from the UE 102, for example, to the P-GW 110. FIG. 1 illustrates a single P-GW 110 for sake of simplicity, though it will be recognized that there are multiple external networks (to the serving network 112) to which data may be directed, where network 114 is just one example. The P-GW 110 provides connectivity between the serving network 112 and external packet data networks as the point of exit and entry for data traffic from/to the UE 102. The P-GW 110 may be involved in per-user based packet filtering, lawful interception, service level gating control, service level rate enforcement, and packet screening to name just a few examples.

As illustrated in FIG. 1, the P-GW 110 provides a point of entry/exit for data packets traveling over the network 114 between the UE 102 and the server 116. The server 116 may be operated by an entity providing sponsorship. In an embodiment, the sponsorship may include a user paying an application service provider for one or more services (e.g., content streaming, online browsing, online purchasing, etc.). In response, the application service provider enables sponsored connectivity through a network to the user's UE, such as a cellular (serving) network, based on a contract with the user. In another embodiment, a sponsored connection may be made available for free to a user's UE based on an attempt by the application service provider to increase its user base (e.g., the application service provider pays the cellular network for the service). Alternatively, the fee for the sponsored connectivity may be collected from a fee collected by other sources, such as ad revenue, instead of from the user.

The server 116 may be referred to herein as an application service provider or application service provider server. In an embodiment, the server 116 may itself host one or more services. Although illustrated as one server, it will be recognized that server 116 may be a standalone system or multiple systems operating in cooperation (e.g., to provide one or more services). The services may be any particular service from among many, for example an online marketplace, a social media network, a search provider, general internet/network access, a content provider, internet access communications, etc. (whether hosted elsewhere or by the server 116 of the application service provider).

The services sponsored may be determined by the application service provider hosted by the server 116. For example, this may occur at the time of provisioning of an agreement between the serving network 112 and the application service provider. In another scenario, the service being sponsored may be determined by the server 116 at the time of attach request from a list of previously agreed-upon (provisioned) services between the serving network 112 and the application service provider. This may be based either upon a specifically requested service from the UE 102 or the serving network 112, or upon an identified service by the server 116.

A user of the UE 102 may have previously established a relationship with the application service provider, for example by registering a user account with a user name and a password maintained by the server 116. According to embodiments of the present disclosure, the server 116 of the application service provider also replicates several aspects of a home subscriber server (HSS), including those aspects that may be necessary or useful for UE attach procedures with the serving network 112. This may include a user name and password (and any hashes/etc. thereof) of the user associated with the UE 102 and authentication functions (including managing security information generation from user identity keys and provision of the security information to network entities), to name some examples.

As will be described in more detail below with respect to subsequent figures including protocol diagrams illustrating signaling aspects between a UE, serving network, and server of an application service provider, the UE 102 may communicate with the serving network 112 and the server 116 using a client token. The client token can be based on (e.g., derived from) a pre-existing credential (e.g., some variant of a password, high entropy key, etc.) previously established between the user of the UE 102 (or the UE 102 itself) and the application service provider. The client token/pre-existing credential may be used according to embodiments of the present disclosure to obtain sponsored connectivity via the serving network 112. By using a pre-existing credential, UEs that do not have SIM cards and/or do not have subscriptions may still obtain sponsored connectivity through an application service provider associated with the pre-existing credential, as well as UEs that may have subscriptions (e.g., to have their data usage or other type of service covered based on the application service provider's particular sponsorship).

In an embodiment, sponsored connectivity may refer to a variety of different aspects. For example, sponsored connectivity may refer to full access to the serving network 112 (e.g., for the purpose of accessing/using an application service provided by the server 116 or a service from a different provider under the sponsorship). Other scenarios include full or partial access to the service for a pre-determined amount of time (and/or number of times), full or partial access to the network generally for a specified period of time/data amount/data bandwidth, full or partial access to the service and/or the network generally for a pre-determined amount of data (e.g., as tracked in bytes or some other size/metric), to name some examples.

In an example, the UE 102 may send, as part of its initial attach request to the RAN 104, a client token based on a pre-existing credential instead of other traditional identifiers. An example of a traditional identifier is an international mobile subscriber identity (IMSI). This is because embodiments of the present disclosure enable the use of a pre-existing credential instead of some kind of subscriber identifier, so that UEs that do not have a SIM card or a subscription to a home network may still utilize sponsored connectivity in a manner that results in greater efficiency and security over the serving network 112 (e.g., by not allowing any IP traffic on the serving network 112 that is first filtered at the P-GW 110). The attach request may also identify the application service provider that the UE 102 wishes to communicate with (i.e., the application service provider with which the user has a pre-existing credential (hashed password/username, high entropy key, etc.)). The RAN 104 forwards the attach request with the UE's client token and service identification to the MME 106. The MME 106 includes a serving network identifier with the information in the attach request and forwards as an authentication information request to S-GW 108 and then on to P-GW 110. The server 116 is able to identify the UE 102 based on the access token provided in the authentication information request from the serving network 112 (e.g., triggered by an attach request from UE 102). Use of an existing credential to obtain sponsored connectivity may increase the amount of UEs that connect to the application service provider's sponsored service (or other service by another provider sponsored by the application service provider server 116).

Figure 2:
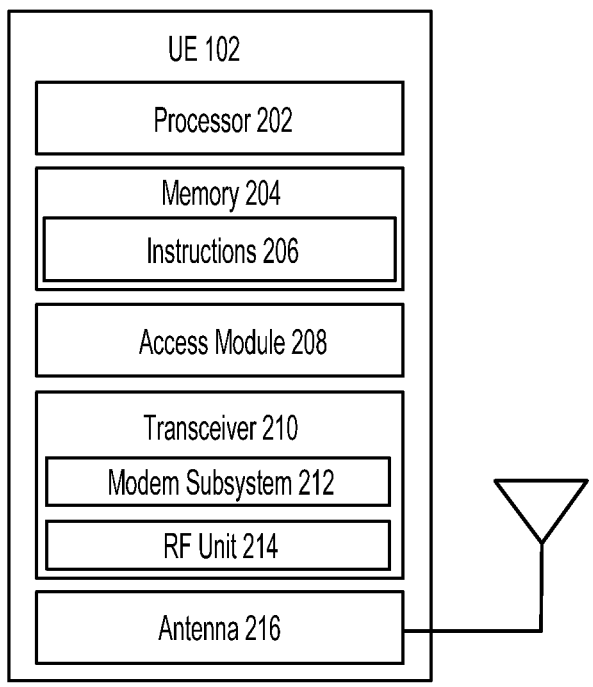
FIG. 2 is a block diagram of an exemplary UE according to embodiments of the present disclosure.

FIG. 2 is a block diagram of an exemplary UE 102 according to embodiments of the present disclosure. The UE 102 may have any one of many configurations described herein. The UE 102 may include a processor 202, a memory 204, an access module 208, a transceiver 210, and an antenna 216. These elements may be in direct or indirect communication with each other, for example via one or more buses.

The processor 202 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the UE 102 introduced above with respect to FIG. 1 and discussed in more detail below. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may also have various features. For example, these can include a cache memory (e.g., a cache memory of the processor 442), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, memristor-based arrays, other forms of volatile and non-volatile memory, or a combination of different types of memory. In some embodiments, the memory 204 can include a non-transitory computer-readable medium.

The memory 204 may store instructions 206. The instructions 206 may include instructions that, when executed by the processor 202, cause the processor 202 to perform operations described herein with reference to the UE 102 in connection with embodiments of the present disclosure. Instructions 206 may also be referred to as code. The terms "instructions" and "code" should be interpreted broadly to include any type of computer-readable statement(s). For example, the terms "instructions" and "code" may refer to one or more programs, routines, sub-routines, functions, firmware, middleware, microcode, procedures, etc. "Instructions" and "code" may include a single computer-readable statement or many computer-readable statements.

The access module 208 may be used for various aspects of the present disclosure. For example, the access module 208 may control the storage and retrieval of one or more pre-existing credentials (and/or derivatives thereof) kept by the UE 102. The access module 208 may receive a password, user name/password combination, high entropy key, token, or identity certificate (to name a few examples) from an input source, e.g. under the direction of a user of the UE 102, and direct the credential (such as user name and password) to a storage location. In an embodiment, the UE 102 may receive the pre-existing credential from the application service provider as an already-hashed version of the password established by the user with the application service provider. Further, the access module 208 may determine a client token that will be used in an attach request from a pre-existing credential. The client token may be determined from a password credential. For example, the client token may be determined by hashing the password with one or more additions, such as a salt, a nonce value, and/or other values as will be discussed in more detail below with respect to later figures.

The access module 208 may also be used during the attach procedure as well. For example, when the UE 102 is attempting to attach to a serving network 112 using a sponsored connection, the access module 208 may retrieve (or dynamically derive/determine at the requested time) the client token based on the pre-existing credential to include in the attach request. Later, when the UE 102 receives an authentication token during mutual authentication with the serving network 112, the access module 208 may assist in determining and creating the authentication response to the authentication token, e.g. by accessing (or determining) one or more keys maintained (or determined) by the access module 208 for this purpose.

The transceiver 210 may include a modem subsystem 212 and a radio frequency (RF) unit 214. The transceiver 210 may be a communications interface for UE 102 or be a component of a communications interface for UE 102. The transceiver 210 is configured to communicate bi-directionally with other devices, such as base stations in the RAN 104. The modem subsystem 212 may be configured to modulate and/or encode the data from the access module 208 and/or memory 204 according to a modulation and coding scheme (MCS), e.g., a low-density parity check (LDPC) coding scheme, a turbo coding scheme, a convolutional coding scheme, etc. The RF unit 214 may be configured to process (e.g., perform analog to digital conversion or digital to analog conversion, etc.) modulated/encoded data from the modem subsystem 212 (on outbound transmissions) or of transmissions originating from another source such as a base station in the RAN 104. Although shown as integrated together in transceiver 210, the modem subsystem 212 and the RF unit 214 may be separate devices that are coupled together at the UE 102 to enable the UE 102 to communicate with other devices.

The RF unit 214 may provide the modulated and/or processed data, e.g. data packets (or, more generally, data messages that may contain one or more data packets and other information, including PMSI values), to the antenna 216 for transmission to one or more other devices. This may include, for example, transmission of data messages to the RAN 104 according to embodiments of the present disclosure. The antenna 216 may further receive data messages transmitted from the RAN 104 and provide the received data messages for processing and/or demodulation at the transceiver 210. Although FIG. 2 illustrates antenna 216 as a single antenna, antenna 216 may include multiple antennas of similar or different designs in order to sustain multiple transmission links.

Figure 3:
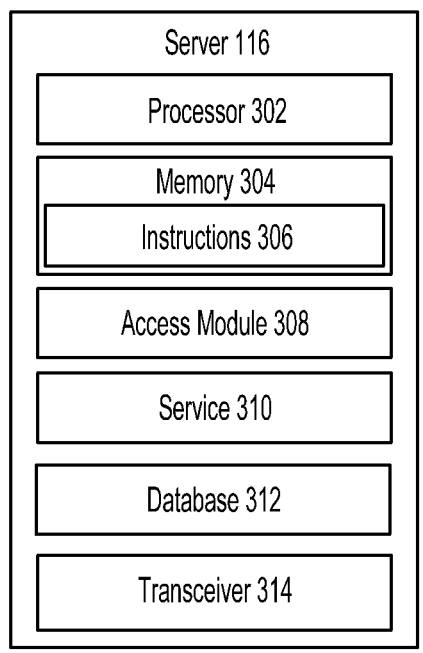
FIG. 3 is a block diagram of an exemplary server according to embodiments of the present disclosure.

FIG. 3 is a block diagram of an exemplary server 116 according to embodiments of the present disclosure. The server 116 may include a processor 302, a memory 304, an access module 308, service 310, a database 312, and a transceiver 314. These elements may be in direct or indirect communication with each other, for example via one or more buses. As mentioned above with respect to FIG. 1, the server 116 may host one or more services, maintain a database of user credentials (user name/password, token, certificate, and/or pre-existing credentials derived from password credentials and/or client tokens derived from pre-existing credentials) and also replicate several aspects of an HSS.

The processor 302 may have various features as a specific-type processor. For example, these may include a CPU, a DSP, an ASIC, a controller, a FPGA device, another hardware device, a firmware device, or any combination thereof configured to perform the operations described herein with reference to the server 116 introduced in FIG. 1 above. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein with reference to the server 116 in connection with embodiments of the present disclosure. Instructions 306 may also be referred to as code, which may be interpreted broadly to include any type of computer-readable statement(s) as discussed above with respect to FIG. 2.

The access module 308 may be used for various aspects of the present disclosure. For example, the access module 308 may be involved in the initial provisioning of the service network to establish sponsored connectivity of one or more identified services via one or more serving networks 112. Further, the access module 308 may retrieve one or more stored (pre-existing) credentials associated with the UE 102 and/or user of the UE 102 in cooperation with the application-specific service 310. For example, the access module 308 may retrieve the pre-existing credential from the database 312 after the service 310 stored it there.

The access module 308 may additionally be involved the initial attach procedure with the UE 102. The server 116 may receive the client token based on a pre-existing credential provided with the initial attach request from the UE 102 and check the corresponding pre-existing credential (and user name, in embodiments where that is included in the attach request) against the user information stored in the database 312. In response to the attach request from the UE 102, the server 116 of the application service provider may generate or access one or more keys and an expected response based on the pre-existing credential and transmit these to the UE 102 as part of an authentication request response (e.g., an authentication vector) to the initial attach request.

The service 310 may be any particular service from among many, for example an online marketplace, a social media network, a search provider, a service provider, etc. In an embodiment, the application service provider represented by the server 116 sponsors connectivity to the service 310. In an alternative embodiment, the service 310 is representative of one or more services offered by entities different from the application service provider, but for which the application service provider (represented by the server 116) provides sponsorship via the serving network 112 for the UE 102 to access.

The application service provider that operates the server 116 may interact with the user of the UE 102 via an out-of-band channel to establish access rights to the application-specific service, for example via the UE 102 or some other communications-enabled device. This may include registration with the application service provider, establishment of user preferences, payment of an access or use fee (where applicable), for example. Establishment of the user name and password with the application service provider (as represented by the server 116 here) via the out-of-band channel may occur at some point in time prior to the attach request for sponsored connectivity and may occur, for example, via WLAN, LAN, Wi-Fi, peer-to-peer, mesh, or some other network besides a cellular network such as the serving network 112 of FIG. 1. The application service provider may, for example by the access module 308, determine the pre-existing credential(s) that the UE 102 may later use as a basis to obtain sponsored connectivity for example by hashing the password with one or more additions, such as a salt, a nonce value, and/or other values.

The database 312 may include one or more databases maintained by the server 116, for example a database that maintains user names and corresponding pre-existing credentials (or passwords in alternative embodiments) on behalf of the application service provider and the access module 308 specifically. The database 312 may track sponsored access information such as user identification and addressing (including, for example, one or more of mobile telephone numbers of all or a subset of UEs that obtain or request sponsored connectivity via the application service provider), profile information, as well as security information associated with each UE that has, or is associated with a user that has, pre-existing credentials (e.g., pre-existing credential, password, identity certificate, high entropy key, and/or one or more security keys).

The transceiver 314 enables the server 116 to communicate to transmit and receive data from external sources, such as the serving network 108. The transceiver 314 may enable wireless and/or wired communications. The transceiver 314 may include, for example, an Ethernet connection, a WiFi connection, or other types of modem and/or RF subsystems as will be recognized. The transceiver 314 may be a communications interface for server 116 or be a component of a communications interface for server 116.

Figure 4:
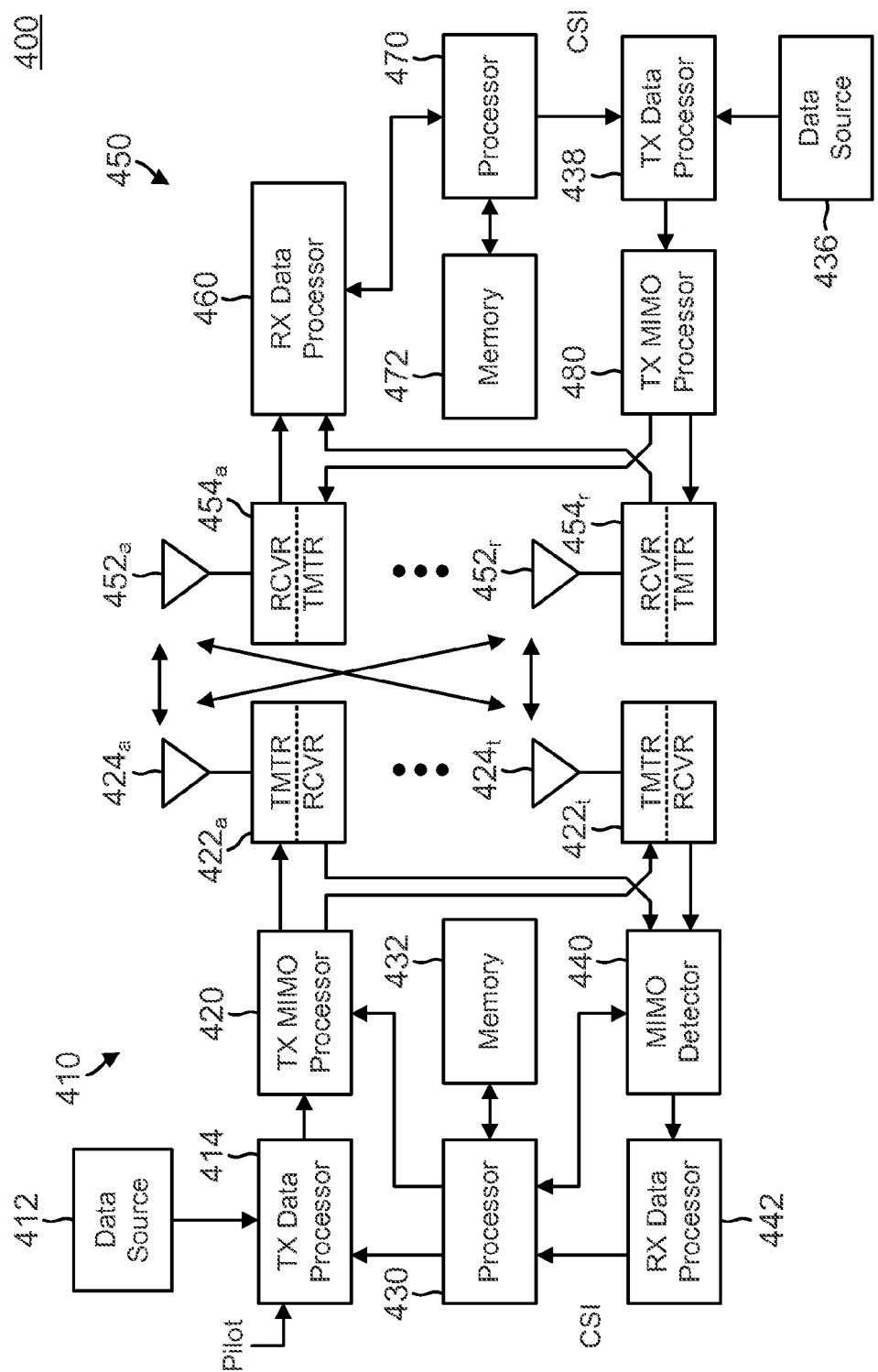
FIG. 4 is a block diagram illustrating an exemplary transmitter system in accordance with various aspects of the present disclosure.

FIG. 4 is a block diagram illustrating an exemplary transmitter system 410 (e.g., a base station in RAN 104) and a receiver system 450 (e.g., a UE 102) in a MIMO system 400, according to certain aspects of the present disclosure. At the transmitter system 410, traffic data for a number of data streams is provided from a data source 412 to a transmit (TX) data processor 414. The traffic data may include all manner of traffic, including authentication requests from one or more MME entities according to aspects of the present disclosure.

In a downlink transmission, for example, each data stream is transmitted over a respective transmit antenna. The TX data processor 414 formats, codes, and interleaves the traffic data for each data stream based on a particular coding scheme selected for that data stream to provide coded data.

The coded data for each data stream may be multiplexed with pilot data using OFDM techniques. The pilot data, e.g., a pilot sequence, is typically a known data pattern that is processed in a known manner and may be used at the receiver system to estimate the channel response or other channel parameters. Pilot data may be formatted into pilot symbols. The number of pilot symbols and placement of pilot symbols within an OFDM symbol may be determined by instructions performed by processor 430.

The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 430. The number of pilot symbols and placement of the pilot symbols in each frame may also be determined by instructions performed by processor 430, for example as described above with respect to FIG. 2 or 3. The transmitter system 410 further includes a memory 432, for example as described above with respect to FIG. 2 or 3 as well.

The modulation symbols for all data streams are then provided to a TX MIMO processor 420, that may further process the modulation symbols (e.g., for OFDM). TX MIMO processor 420 then provides $N_T$ modulation symbol streams to $N_T$ transmitters (TMTR) $422_a$ through $422_t$. In some embodiments, TX MIMO processor 420 applies beamforming weights to the symbols of the data streams and to the antenna from which the symbol is being transmitted. The transmitter system 410 includes embodiments having only one antenna or having multiple antennas.

Each transmitter 422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters $422a$ through $422t$ are then transmitted from $N_T$ antennas $424_a$ through $424_t$, respectively. The techniques described herein apply also to systems with only one transmit antenna. Transmission using one antenna is simpler than the multi-antenna scenario. For example, there may be no need for TX MIMO processor 420 in a single antenna scenario.

At receiver system 450, the transmitted modulated signals are received by $N_R$ antennas $452_a$ through $452_r$ and the received signal from each antenna 452 is provided to a respective receiver (RCVR) $454_a$ through $454_r$. Each receiver 454 conditions (e.g., filters, amplifies, and downconverts) a respective received signal, digitizes the conditioned signal to provide samples, and further processes the samples to provide a corresponding "received" symbol stream. The techniques described herein also apply to embodiments of receiver system 450 having only one antenna 452.

An RX data processor 460 then receives and processes the $N_R$ received symbol streams from receivers $454_a$ through $454_r$ based on a particular receiver processing technique to provide $N_T$ detected symbol streams. The RX data processor 460 then demodulates, deinterleaves, and decodes as necessary each detected symbol stream to recover the traffic data for the data stream. The recovered traffic may include, for example, information in an authentication information request from an MME according to aspects of the present disclosure. The processing by RX data processor 460 can be complementary to that performed by TX MIMO processor 420 and TX data processor 414 at transmitter system 410.

Information provided by the RX data processor 460 allows the processor 470 to generate reports such as channel state information (CSI) and other information to provide to the TX Data Processor 438. Processor 470 formulates a reverse link message comprising the CSI and/or pilot request to transmit to the transmitter system.

The processor 470 may be implemented for example as described above with respect to the processors described in FIG. 2 or 3. In addition to reverse link messages, the receiver system 450 may transmit other various types of information including attach requests that include client tokens based on pre-existing credentials for sponsored connectivity to the serving network 112, responses for mutual authentication, and other information for establishing a sponsored communication session as well as data during the communication session. The message can be processed by a TX data processor 438, modulated by a TX MIMO processor 480, conditioned by transmitters $454_a$ through $454_r$, and transmitted back to transmitter system 410. As shown, the TX data processor 438 may also receive traffic data for a number of data streams from a data source 436.

At transmitter system 410, the modulated signals from receiver system 450 are received by antennas 424, conditioned by receivers 422, demodulated by a demodulator 440, and processed by a RX data processor 442 to extract the reverse link message transmitted by the receiver system 450. As a result, data may be sent and received between the transmitter system 410 and the receiver system 450. The transmitter system 410 may also be used to transmit information it receives from the receiver system 450 to other network elements within its serving network and receive information from one or more other network elements in the serving network, as will be recognized. The embodiment illustrated in FIG. 4 is exemplary only, and embodiments of the present disclosure are applicable to other transmitter/receiver systems not illustrated in FIG. 4.

Figure 5:
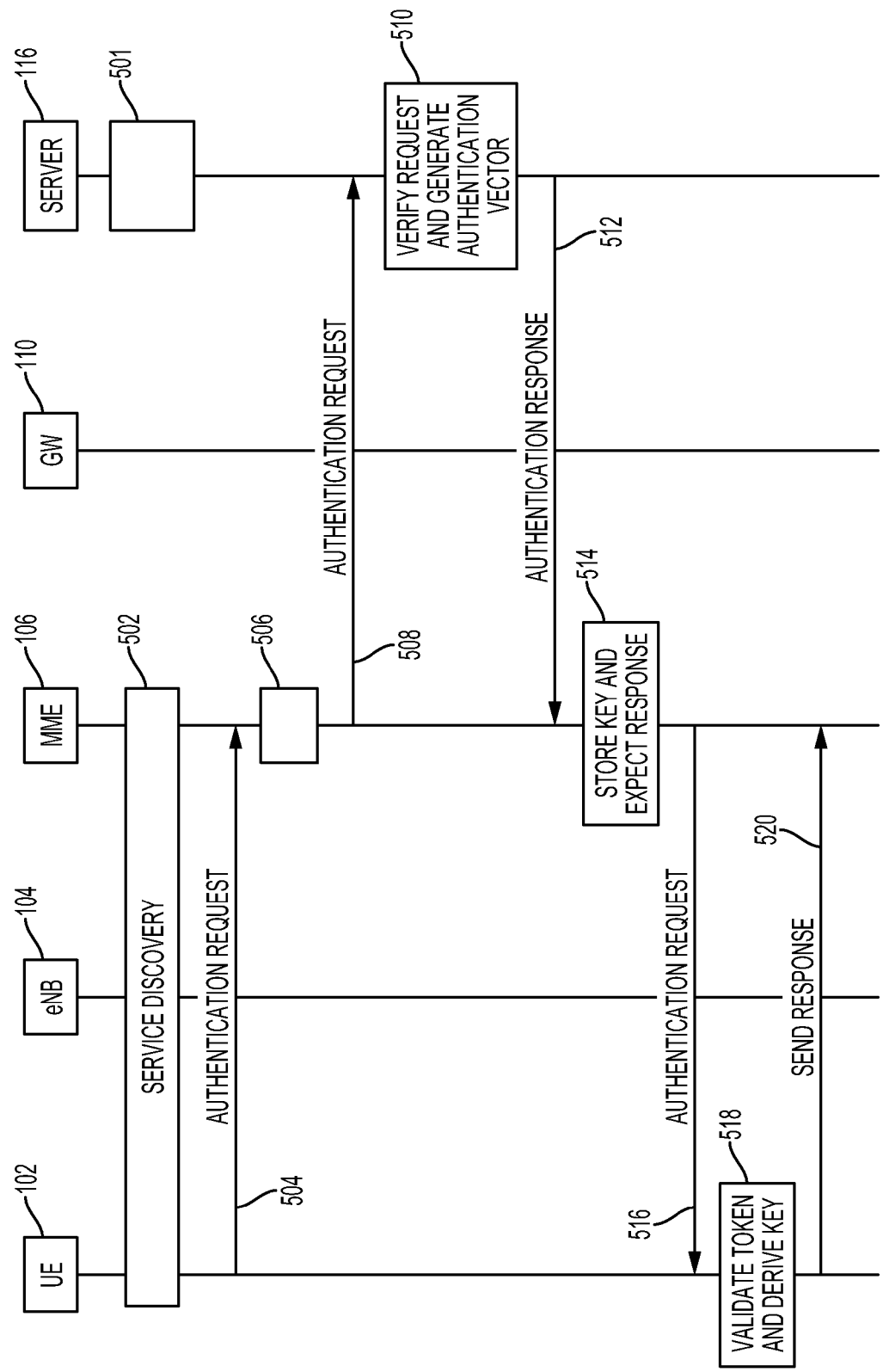
FIG. 5 is a protocol diagram illustrating exemplary signaling aspects between a UE, serving network, and application service provider to provide sponsored connectivity in accordance with various aspects of the present disclosure.

FIG. 5 is a protocol diagram illustrating some signaling aspects between a UE, serving network, and application service provider to provide sponsored connectivity in accordance with various aspects of the present disclosure. For simplicity of discussion, reference will be made to the elements shown in FIG. 1 (e.g., UE 102, RAN 104 (shown as eNB 104 in FIG. 5), MME 106, GW 110, and server 116 as the application service provider that hosts the application-specific service) in describing the actions in the protocol diagram of FIG. 5. Further for simplicity, discussion will focus on those aspects of the protocol flow that describe aspects of embodiments of the present disclosure instead of all aspects of an attach procedure. The approach illustrated in FIG. 5 describes an embodiment in which the client token is based on a pre-existing credential (based on a password) shared between the UE 102 and the server 116.

In action 502, the UE 102 undertakes a service discovery procedure with the serving network 112. The service discovery may be enabled by a service provisioning function that the server 116 engaged in previously with the serving network 112. In an embodiment, a result of the service provisioning function includes the serving network 112 broadcasting to some or all recipients (e.g., UEs 102) information identifying the sponsored connectivity by the application service provider hosted by server 116. In another embodiment, the UE 102 may have been provided with information from the server 116 identifying some or all trusted networks, or networks that have entered into agreements to provide the sponsored connectivity on behalf of the application service provider hosted by the server 116.

After the UE 102 has discovered the serving network 112, at action 504 the UE 102 sends an authentication request to the eNB 104. This is done in an attempt to attach to the serving network 112. Upon receiving the authentication request, the eNB 104 forwards the authentication request on to the MME 106. The authentication request includes a client token that is based on a pre-existing credential that was previously established between the UE 102 (or user of the UE 102 and provided to the UE 102) and the application service provider hosted by the server 116. The authentication request does not include a subscriber identifier (e.g., IMSI, etc.). In an embodiment, the authentication request does not include a credential associated with an existing cellular network. The authentication request may also include a user name associated with the pre-existing credential as previously established with the application service provider. In order to assist the serving network 112 in routing the authentication request correctly, the UE 102 may also include information to identify the server 116, such as the domain name of the application service provider at the server 116 or an application ID.

The client token may assume a variety of forms and have a number of different features. For example, a pre-existing credential may be generated by first placing the established password between the UE 102 and the application service provider (e.g., via an out-of-band channel such as a WLAN connection) with a salt concatenated with a name of the application service provider into a hash-function message authentication code (HMAC). The output of the HMAC function may be designated as the "pre-existing credential" for purposes of this discussion. The resulting value of the "pre-existing credential" may be input into another HMAC function where the additional input is a nonce value, with the output being the client token. The client token enables the application service provider to verify possession of a valid pre-existing credential. A client token may be used instead of the pre-existing credential (or password) so that no malicious attacker may intercept the information and attempt to masquerade as the user associated with the UE 102 in an unauthorized manner. Although the client token is described herein as the value that is included with the authentication request, it will be recognized that the pre-existing credential may instead be included, though it may expose the user to additional security risks than would be the case with the client token. The generation of these values is illustrated in Equations 1 and 2:

$$\text{pre-existing credential} = \text{HMAC}(\text{password}, \text{salt}|\text{service name}), \text{ where } | \text{ is the concatenation operator;} \quad \text{(Eq. 1)}$$

$$\text{client token} = \text{HMAC}(\text{pre-existing credential}, \text{Nonce}). \quad \text{(Eq. 2)}$$

The client token, in turn, is included in a client vector for inclusion in the attach request, e.g. client vector=[user name, Nonce, client token]. As another example, in an embodiment the UE 102 may use a Lamport one-time hash to generate the client token. To arrive at the pre-existing credential under this alternative embodiment, Equations 1 and 2 change to look as follows in Equations 3 and 4:

$$\text{pre-existing credential} = \text{HMAC}^i(\text{password}, \text{salt}|\text{service name}), \text{ where } | \text{ is the hash index;} \quad \text{(Eq. 3)}$$

$$\text{client token} = \text{HMAC}(\text{pre-existing credential}, \text{Nonce}). \quad \text{(Eq. 4)}$$

The client token, in turn, is included in a client vector for inclusion in the attach request, e.g. client vector=[user name, i, Nonce, client token]. As seen in Equation 3, an index i is added. HMAC$^i$ symbolizes "i" runs of the hashing operation. Thus, the pre-existing credential further includes the hash index i so the server 116 will be able to know how many times the hashing operation was performed so it may go through similar steps at its end.

As another example, instead of the pre-existing credential being based on a password, the pre-existing credential may be a key or other value provisioned previously by the server 116 with the UE 102. The key may be, for example, a high entropy key (e.g., a 256 bit key) that the server 116 has associated with the account of the user of UE 102. The high entropy key may be generated according to a random selection process or some other manner, as will be recognized. In this situation, to create the client token the key is taken as the pre-existing input into equation 2 or 4 in place of the pre-existing credential generated from either equations 1 or 3 respectively.

For added security for any of the equations described above, multi-factor authentication (MFA) may also be used. When used, the derivation of the client token may incorporate another credential referred to as a one-time passcode (OTP). Thus, Equations 2 and 4 would be modified as follows:

client token=HMAC(pre-existing credential,Nonce|OTP) (Eq. 2)

client token=HMAC(pre-existing credential,Nonce|OTP). (Eq. 4)

The client token, in turn, is included in a client vector for inclusion in the attach request, e.g. client vector=[user name, Nonce, i (where eq. 4 used), client token]. Although described above as a series of derivations, it will be recognized that determining the pre-existing credential and the access token may instead involve looking up one or more values in a look-up table (that were, for example, derived previously by the UE 102 or server 116 or some other entity and provided to the UE 102/server 116).

The MME 106 receives the authentication request that was forwarded from the eNB 104, and at action 506 adds a serving network identifier to the authentication request corresponding to the serving network 112. The MME 106 may additionally establish a secure connection to the server 116 through the GW 110 (e.g., a transport layer security (TLS) or hypertext transfer protocol secure (HTTPS) to name two examples) to transmit the modified authentication request to the server 116.

At action 508, the MME 106 transmits the modified authentication request to the server 116.

At action 510, once the server 116 receives the modified authentication request the server 116 proceeds with verifying the modified authentication request. This may include obtaining the pre-existing credential from the client token and comparing the pre-existing credential against a local database of pre-existing credentials associated with previously established accounts to determine if there is a match between the pre-existing credential from the client token and one in the database. For example, the comparing may include subtracting one value from the other and determining if a zero value results, or some value within a predetermined range of zero (either positive or negative). As will be recognized, other methods of comparison may also be used without departing from the scope of the present disclosure.

This is possible because the server 116 also follows the same approach as described above in arriving at the client token for a given pre-existing credential (and for arriving at the pre-existing credential for a given password). In an embodiment, this is a result of the UE 102 and the server 116 agreeing beforehand, for example in the out-of-band channel, on a particular derivation approach for the client token (and pre-existing credential in some embodiments). In another embodiment, this is a result of the UE 102 including in the authentication request an identification of which authentication type was relied upon (e.g., according to Equations 1/2 or Equations 3/4, or a key, identity certificate, etc.). As a result, the server 116 may access the pre-existing credential (or password) associated with the user name included in the authentication request and perform the same operations on the pre-existing credential (or password) at the server 116 as was done on the pre-existing credential at the UE 102. Alternatively, the client token may be derived beforehand and the received client token compared against the local version at the server 116.

If the server 116 cannot verify the pre-existing credential associated with the request of the UE 102 (e.g., cannot confirm that the value of the pre-existing credential from the client token matches the value of a pre-existing credential in the database), the server 116 will deny the request. If the server 116 verifies the pre-existing credential (e.g., by confirming a match), the server 116 proceeds with compiling an authorization vector. Thus, in response to receiving the authentication request that included a client token from the UE 102, according to embodiments of the present disclosure the UE 102 is authenticated to the server 116 before mutual authentication is performed between the UE 102 and the serving network 112 (in contrast to current practices where a UE is not authenticated to the HSS as part of an authentication request). In an embodiment, the authorization vector components are derived based off of the pre-existing credential of Equation 1 or Equation 3 above, depending upon the approach taken at the UE 102 (the same approach can be taken at both UE 102 and server 116 so that mutual authentication will be possible between the UE 102 and the MME 106 later). The authorization vector may include $K_{ASME}$ (Access Security Management Entity), an authentication token (AUTN), a random number (RAND), and an expected response from the UE (XRES). The $K_{ASME}$ is an MME 106 base key that is known to both the MME 106 and the server 116 because the server 116 shares it with the MME 106. According to this embodiment, $K_{ASME}$ is based on the "pre-existing credential" value from Equations 1 or 3 as well as the Nonce and RAND values.

In another embodiment, before compiling the authentication vector the server 116 may use a PAKE (password-authenticated key agreement) to arrive at a new shared secret key between the UE 102 and the server 116. For example, as part of the PAKE procedure, the server 116 may engage in a four-way handshake with the UE 102. Other levels of handshake (e.g. two-way, three-way, etc.) may be possible as will be recognized. The elements of the serving network 112 may convey the communications between the UE 102 and the server 116 during the 4-way handshake (even though the attach procedure has not completed yet). Once a shared secret key is agreed upon, both the UE 102 and the server 116 store the shared secret key and the server 116 uses the shared secret key to derive $K_{ASME}$. Completion of a PAKE procedure results in the UE 102 and the server 116 mutually authenticating each other prior to the UE 102 performing mutual authentication with the serving network 112.

In aspects of the present disclosure, the server 116 uses one or the other—derivation of $K_{ASME}$ based on the "pre-existing credential" (Eq. 1 or 3) or based on a new shared secret key. In another aspect, the server 116 may attempt derivation of $K_{ASME}$ based on the "pre-existing credential" first and, if that were to fail for some reason, transition then to using PAKE to establish a new shared secret key to use in deriving $K_{ASME}$, if both approaches are supported by both the UE 102 and the server 116. $K_{ASME}$ may remain valid for the duration of the authentication session. Further, $K_{ASME}$ may be used to derive subsequent keys, including NAS encryption and integrity keys and application server (AS) encryption and integrity keys.

Once the authentication vector is compiled, at action 512 the server 116 sends the authentication response back to the MME 106 via the secure connection.

At action 514, the MME 106 extracts $K_{ASME}$ and the expected response XRES from the authentication vector. The MME 106 stores these values and forwards on the random value RAND and the authentication token AUTN to the UE 102 in action 516 in an authentication request to the UE 102 (e.g., for mutual authentication to the serving network 112).

At action 518, once the UE 102 receives the authentication request with the authentication token AUTN and RAND from the MME 106, the UE 102 attempts to validate the authentication token AUTN. The UE 102 validates the authentication token AUTN based on the shared secret key with the server 116. In embodiments where PAKE is not used, this is the value the "pre-existing credential" as derived according to Equations 1 or 3 above. Where PAKE is used, it is the shared secret key stored at the UE 102 after agreement with the server 116 from the four-way handshake. For example, the UE 102 determines its own version of AUTN based on the shared secret (pre-existing credential or shared secret key) and compares to the AUTN received from the MME 106. If the values do not match, then the UE 102 cannot validate AUTN and authentication fails. If there is a match, then AUTN is validated and the UE 102 proceeds with determining a response RES and its own version of $K_{ASME}$, which the UE 102 and MME 106 will later use to derive other keys for encryption and integrity protection of NAS signaling.

At action 520, the UE 102 sends the RES to the MME 106 so that the MME 106 may compare XRES that it stored previously from the server 116 to the RES received from the UE 102. If the two match, then the authentication has been successful and the process may then proceed with NAS and AS key setup. As a result, the UE 102 may access the service, via the serving network 112, with the application service provider hosted by the server 116 sponsoring (e.g., covering some or all of the cost for the specific access) the connection of the UE 102 with the serving network 112. This is true even where the UE 102 does not have a SIM card or existing subscription with any home network/service provider.

Figure 6:
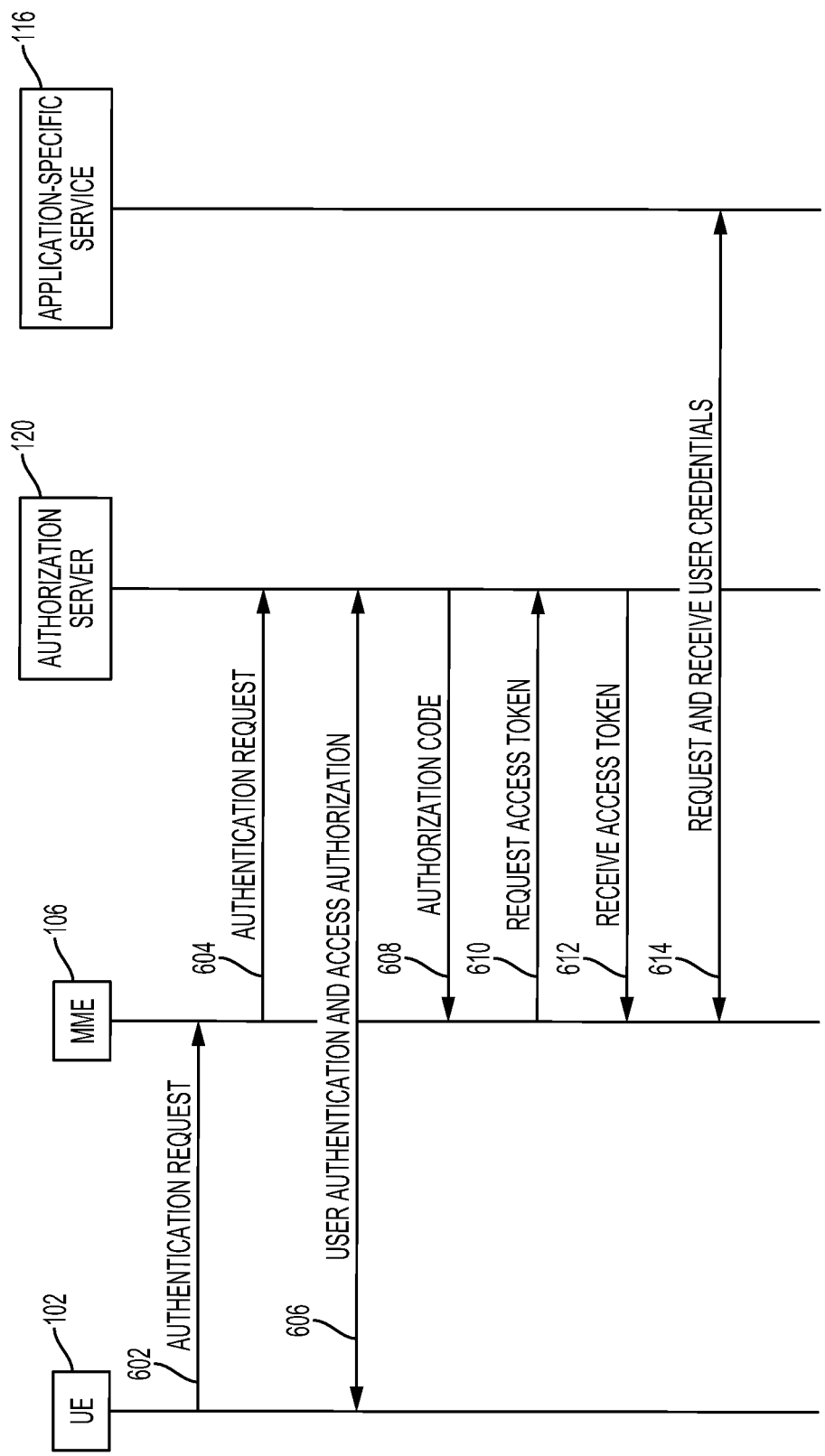
FIG. 6 is a protocol diagram illustrating exemplary signaling aspects between a UE, serving network, and application service provider to provide sponsored connectivity in accordance with various aspects of the present disclosure.

FIG. 6 is a protocol diagram illustrating signaling aspects between a UE, serving network, and application service provider to provide sponsored connectivity in accordance with various aspects of the present disclosure. For simplicity of discussion, reference will be made to the elements shown in FIG. 1 (e.g., UE 102, MME 106, server 116 operated by the application service provider, and an authorization server 120 that may be separate from or integrated with the server 116) in describing the actions in the protocol diagram of FIG. 6. FIG. 6 describes an embodiment in which the UE 102 authorizes the MME 106 to access credentials associated with the user of the UE 102 at the server 116.

At action 602, the UE 102 sends an attach request to the serving network 112, which the MME 106 receives, to access a sponsored service via the server 116 (the application service provider). The attach request includes information indicating that the UE 102 wishes to authenticate directly with the server 116, instead of providing the client token that is based on a pre-existing credential as part of an authentication request as at action 504 of FIG. 5 discussed above. For example, the UE 102 may include a user name associated with the application service provider without providing a client token based on a pre-existing credential. The attach request may explicitly include an identifier that the MME 106 understands to indicate that the UE 102 needs to authenticate directly with the server 116, or this may be indirectly inferred by the MME 106 by virtue of the fact that the attach request lacks a credential. The UE 102 may also include information to identify the server 116 (such as the domain name of the application service provider at the server 116 or an application ID) to assist the serving network 112 in routing aspects of the request to the server 116. The attach request does not include any kind of subscriber identifier (e.g., IMSI, etc.). The attach request may also identify the requested scope of its access of the serving network 112 (e.g., for sponsored connectivity to the service by the server 116).

At action 604, the MME 106 determines that there is no client token based on a pre-existing credential and/or locates the explicit identifying information, and therefore sends an authentication request to the authorization server 120. As noted above, the authorization server 120 may be a separate entity from the server 116 or be integrated with it. The MME 106 may include in the authentication request an identifier of the serving network 112. The identifier may have been provided to, or received from, the authorization server 120 at a prior time when the sponsored relationship was provisioned between the application service provider (represented as server 116) and the serving network 112.

At action 606, the authorization server 120 initiates communication with the UE 102 via the serving network 112 to authenticate the UE 102. The elements of the serving network 112 may convey the communications between the UE 102 and the authentication server 120 during the user authentication and access authorization process, which may involve one or more requests and responses back and forth between the UE 102 and the authorization server 120 (even though the attach procedure has not completed yet). For example, a user interface of the UE 102 may direct or request a user of the UE 102 to enter a user name and password via a user interface (not shown) to authenticate (e.g., a user name a password that matches one in a profile stored at, or accessible by, the authorization server) the user that is already associated with the application service provider operating server 116. As another example, the UE 102 may access a pre-existing credential (or key, or identity certificate) for the application service provider that was stored previously in the memory 204 (e.g., via the access module 208) without requiring the user to interact via the user interface.

In addition to authenticating the user associated with the application service provider at action 606, the authorization server 120 also obtains an access authorization from the UE 102 allowing the MME 106 (or other appropriate network element in the serving network 112) to access the user profile associated with the UE 102 from the server 116. In an embodiment, the access authorization is obtained separate and distinct from the user authentication (e.g. a separate query). In another embodiment, the access authorization may be implied from successful user authentication. If user authentication and/or access authorization fails, then the process stops and the UE 102 is notified by the MME 106, which is notified from the authorization server 120.

If user authentication and access authorization are successful, at action 608 the authorization server 120 sends an authorization code to the MME 106 (instead of, for example, to the UE 102 and then redirected back to the MME 106). The authorization code is a value different from the pre-existing credential, password, or other related credential of the user, and therefore is sheltered from the MME 106. With the authorization code, the authorization server 120 may also include an instruction for the MME 106 to use the authorization code for verification when requesting an access token as described below.

With the authorization code, the MME 106 is ready to request an access token from the authorization server 120 to gain access to the user profile associated with the UE 102 from the server 116. At action 610, the MME 106 sends a request to the authorization server 120 for an access token. As part of the request, the MME 106 includes the authorization code received at action 608. The request may further include an identification of the serving network 112 (or at least the MME 106).

At action 612, the authorization server 120 responds to the access token request of action 610 after authenticating the MME 106 (or, more generally, the serving network 112) and validating the authorization code. If unsuccessful, the response indicates the denial and, in some embodiments, a reason or an indication about the denial. If successful (e.g., the proper authorization code is provided) the authorization server 120 responds with the requested access token to the MME 106. The response may include, in addition to the access token, a description of the type of the access token, a specified period of time after which the access token will expire (will no longer be valid), and a refresh token in case the access token expires (which can be used to obtain a new access token).

At action 614, the MME 106—now with the access token—proceeds with requesting and receiving the user credentials. This can be done for the MME 106 to assist in completing an attach of the UE 102 to the serving network 112 where the connectivity to the serving network 112 is now sponsored by the application service provider hosted by the server 116. As a result, the embodiments of FIG. 6 enable a UE 102 to attach to a serving network 112 without providing a client token based on a pre-existing credential (e.g., password, hashed password, or access token previously stored at the UE 102, etc.) in the attach request.

Figure 7A:
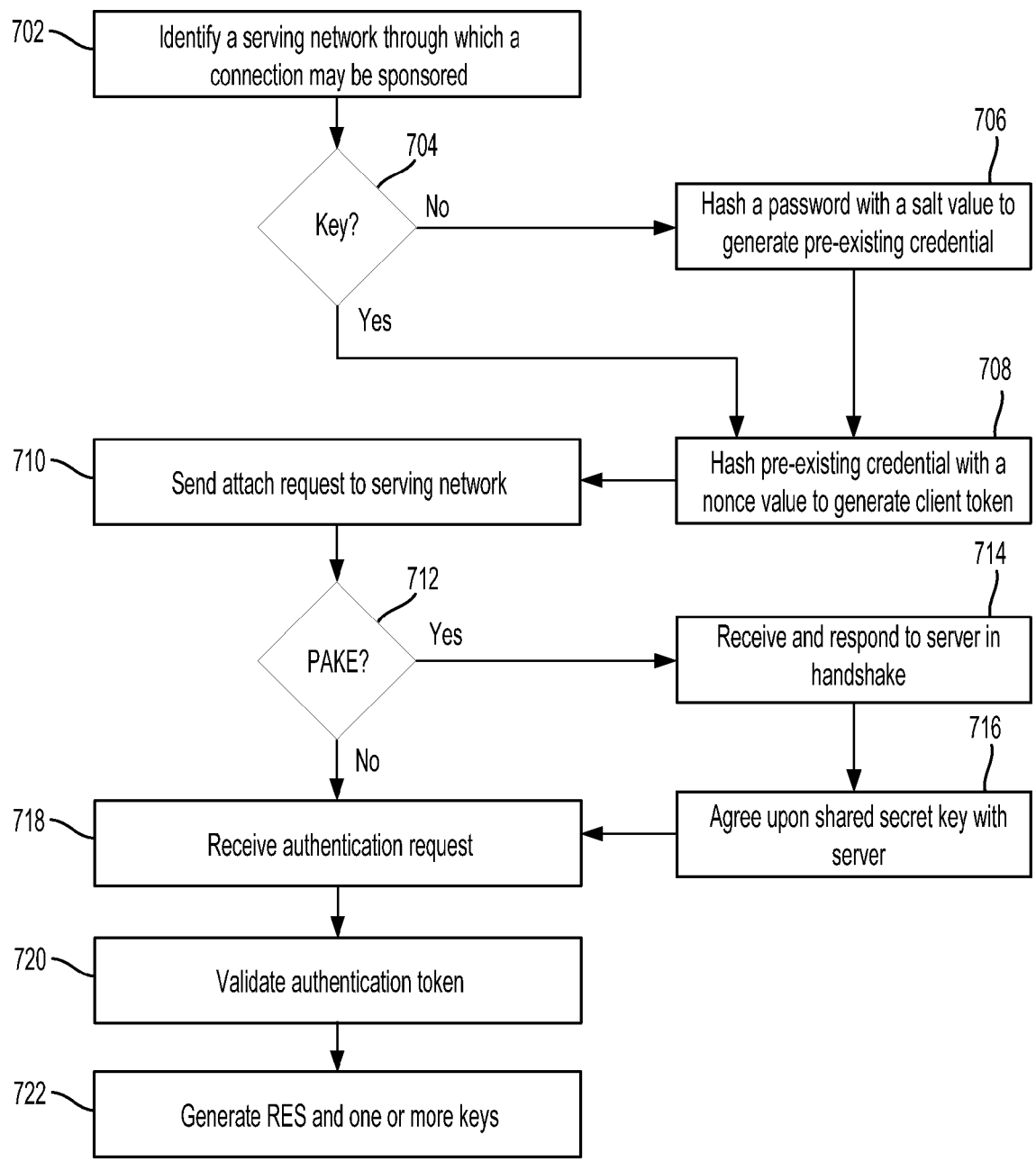
FIG. 7A is a flowchart illustrating an exemplary method for accessing a network for a service sponsored by a server in accordance with various aspects of the present disclosure.

Turning now to FIG. 7A, a flowchart illustrates an exemplary method 700 for accessing a network for a service sponsored by an application service provider operating a server in accordance with various aspects of the present disclosure. Method 700 may be implemented in the UE 102. The method 700 will be described with respect to a single UE 102 for simplicity of discussion, though it will be recognized that the aspects described herein may be applicable to a plurality of UEs 102. It is understood that the "actions" above and the "steps" below may be used interchangeably. It is also understood that additional steps can be provided before, during, and after the steps of method 700, and that some of the steps described can be re-ordered, replaced, or eliminated for other embodiments of the method 700.

At step 702, the UE 102 identifies one or more serving networks 112 through which a sponsored connection may be available. For example, the UE 102 may receive one or more broadcasts from the one or more serving networks 112 advertising sponsored connectivity for one or more services. As another example, the UE 102 may check memory 204 for a list of trusted networks that may have been stored in the UE 102 previously based upon information from the server hosting the application service provider.

There are several different ways in which the UE 102 may use a pre-existing credential to authenticate to the serving network 112 to take advantage of an offered sponsorship of connectivity. If the UE 102 set up a user name and password with the server 116, the decision step 704 may direct the method 700 to step 706.

At step 706, the UE 102 hashes the password with a salt value, for example as described above with respect to either Equations 1 or 3, resulting in the pre-existing credential. In alternative embodiments, this step may not be necessary where the server 116 (e.g., via the out-of-band channel) provisioned the UE 102 with the pre-existing credential of the password previously.

At step 708, the UE 102 takes the pre-existing credential and hashes it with a nonce value (and/or other values) to result in the client token, for example as described above with respect to either Equations 2 or 4.

Returning to decision step 704, if the UE 102 instead received a key, such as a high entropy key, from the server 116 at a prior time for use in logging in to the application service provider's server 116, then the method 700 proceeds to step 708 (skipping step 706), where the pre-existing credential is the key that is used in either Equations 2 or 4.

At step 710, the UE 102 sends an attach request to the serving network 112 in an attempt to take advantage of the sponsored connectivity. The UE 102 sends, as part of its attach request, the client token instead of other traditional identifiers, such as an IMSI. The client token may be included as part of a client vector that, in addition to the client token, includes the user name associated with the pre-existing credential and a nonce value (and index, where used).

After the UE 102 has sent the attach request to the serving network 112, as described with respect to the various figures above, the serving network 112 forwards the request on to the server 116 as an authentication information request to the server 116. The server 116 may then verify the request. Verification may include comparing aspects of the client vector, such as user name and/or password provided by the UE 102 (associated with a user of the UE 102) with access information maintained by the application service provider's server 116. Verification may occur where the comparison results in a determination of a match between the compared values. After verification, the server 116 proceeds with compiling an authentication response (vector). The authorization response (vector) may include $K_{ASME}$, AUTN, RAND, and XRES, where a network node element of the serving network 112 (e.g., MME 106) may store XRES and $K_{ASME}$ locally and forward on RAND and AUTN to the UE 102.

If the UE 102 and the server 116 are set up for PAKE, then at decision step 712 the method 700 proceeds to step 714.

At step 714, the UE 102 receives a communication from the server 116 that was conveyed via the serving network 112. The communication is the initial message of a handshake (e.g., four-way) between the UE 102 and the server 116.

At step 716, the UE 102 and the server 116 agree upon an updated shared secret key during the handshake. Once a shared secret key is agreed upon, both the UE 102 and the server 116 store the shared secret key and the server 116 uses the shared secret key to derive one or more other keys, such as $K_{ASME}$.

After the UE 102 and the server 116 have agreed upon a shared secret key, the server 116 uses the shared secret key to generate one or more aspects of the authentication vector that will be provided in the response to the serving network 112 and, in part, to the UE 102.

The method 700 proceeds to step 718, where the UE 102 receives an authentication request from the serving network 112 that is based on an authentication response received at the serving network 112 from the server 116. The authentication request includes an authentication token that was generated or otherwise determined by the server 116 and forwarded by the serving network 112. The authentication request may also include a random number from the server 116.

Returning to decision step 712, if the UE 102 and the server 116 are not set up for PAKE, then the method 700 proceeds to step 718 as already described.

At step 720, the UE 102 validates the authentication token. The UE 102 validates the authentication token AUTN based on the shared secret key with the server 116 (where PAKE was used) or the intermediate password credential. For example, the UE 102 determines its own version of AUTN based on the shared secret (the pre-existing credential or shared secret key) and compares to the AUTN received from the serving network 112.

If there is a match, then the method 700 proceeds to step 722 where the UE 102 determines a response RES and its own version of $K_{ASME}$, which the UE 102 and serving network 112 (e.g., MME 106) will later use to derive other keys for encryption and integrity protection of NAS signaling.

If the RES from the UE 102 matches the XRES from the server 116 at the MME 106, then the authentication has been successful and the process may then proceed with NAS and AS key setup. As a result, the UE 102 may access the service, via the serving network 112, with the application service provider server 116 sponsoring (e.g., covering some or all of the cost for the specific access) the connection of the UE 102 with the serving network 112. This is true even where the UE 102 does not have a SIM card or existing subscription with any home network/service provider.

Figure 7B:
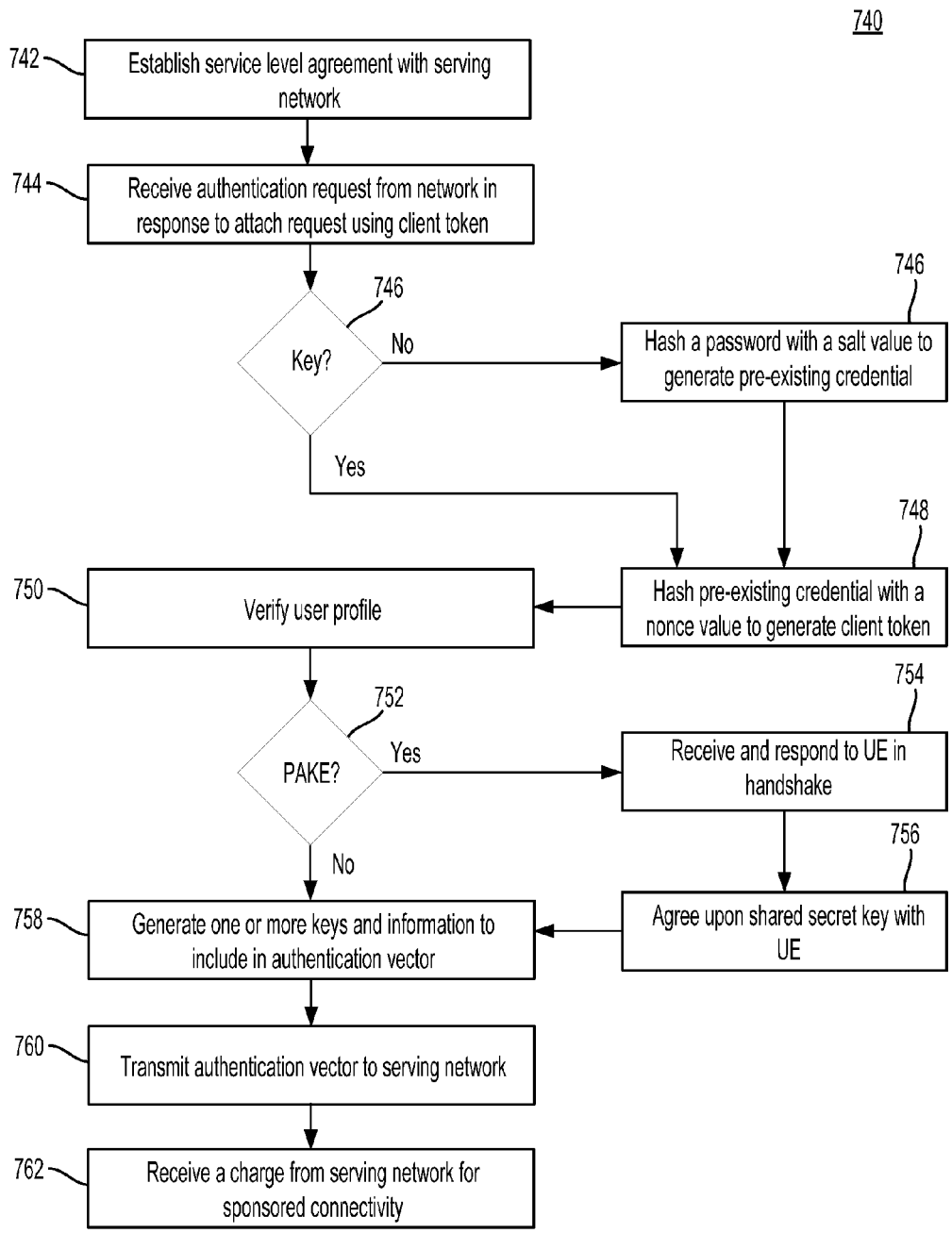
FIG. 7B is a flowchart illustrating an exemplary method for granting network access for a service sponsored by a server in accordance with various aspects of the present disclosure.

FIG. 7B is a flowchart illustrating an exemplary method 740 for granting network access for a service sponsored by an application service provider in accordance with various aspects of the present disclosure. The method 740 may be implemented in the server 116. The method 740 will be described with respect to a single server 116 for simplicity of discussion, though it will be recognized that the aspects described herein may be applicable to a plurality of servers 116. It is understood that additional steps can be provided before, during, and after the steps of method 740, and that some of the steps described can be re-ordered, replaced, or eliminated for other embodiments of the method 740.

At step 742, the server 116 establishes a service level agreement with the serving network 112 (e.g., by way of a service provisioning function). As a result of the service provisioning function, the serving network 112 may broadcast to recipients' information identifying the sponsored connectivity to the service on behalf of the server 116. In an embodiment, this may also involve the server 116 providing the UE 102 with information identifying some or all trusted networks, or networks that have entered into agreements to provide the sponsored connectivity to the service on behalf of the server 116.

At step 744, the server 116 receives an authentication request from the serving network 112 in response to the serving network 112 receiving an attach request from the UE 102 (which included a client token instead of IMSI or other cellular identifier).

There are several different types of pre-existing credential which a UE 102 may use to authenticate to the serving network 112 to take advantage of an offered sponsorship of connectivity by the server 116. If the UE 102 had set up a user name and password with the server 116, the decision step 746 may direct the method 740 to step 746.

At step 746, the server 116 hashes the password, associated with the user whose UE 102 is attempting to take advantage of the sponsored connectivity, with a salt value, for example as described above with respect to either Equations 1 or 3, resulting in the pre-existing credential. In an alternative embodiment, this step may be skipped where the server 116 provisioned the pre-existing credential of the password previously.

At step 748, the server 116 takes the pre-existing credential and hashes it with a nonce value (and/or other values), for example as described above with respect to either Equations 2 or 4 to result in a server side copy of the client token.

At step 750, the server 116 verifies the authentication request against the user's profile (e.g., user name, credential, etc. comparison). In an embodiment, this may include comparing the client token received with the server side copy determined. A match is possible because the server 116 and UE 102 may each hash the pre-existing credential in the same manner to arrive at the client token.

Returning to decision step 746, if the server 116 and UE 102 had instead relied on a key (such as a high entropy key) sent from the server 116 at a prior time for use in logging in to the application service provider represented by the server 116, then the method 740 proceeds to step 748, where the pre-existing credential is the high entropy key. The method 740 then proceeds to step 750 as discussed.

If the server 116 and the UE 102 are set up for PAKE, then at decision step 752 the method 740 proceeds to step 754.

At step 754, the server 116 initiates communications with the UE 102 via the serving network 112. The communication is the initial message of a handshake (e.g., four-way) between the server 116 and the UE 102.

At step 756, the server 116 and the UE 102 agree upon an updated shared secret key during the handshake. Once a shared secret key is agreed upon, both the UE 102 and the server 116 store the shared secret key (e.g., for the duration of the authentication session).

At step 758, the server 116 uses the shared secret key to derive one or more other keys, such as $K_{ASME}$, and generate other aspects of an authentication vector including AUTN. The server 116 also generates/determines other values for inclusion in the authentication vector including XRES and a random number RAND.

Returning to decision step 752, if the UE 102 and the server 116 are not set up for PAKE, then the method 740 proceeds to step 758 as already described, where the shared secret key is, instead, the pre-existing credential.

At step 760, the server 116 transmits the authentication vector to the serving network 112 (e.g., to the MME 106). The MME 106 stores $K_{ASME}$ as well as the XRES and forwards other aspects including the AUTN and RAND to the UE 102 for mutual authentication. If mutual authentication is successful between the MME 106 and the UE 102, then the process may then proceed with NAS and AS key setup between the serving network 112 and the UE 102, and eventually the UE 102 may proceed with accessing the service via the serving network 112 based on the sponsored connection. The serving network 112 tracks aspects of the sponsored connection (e.g., accounting, metering, billing, and other functions).

At step 762, at some point after the successful attach of the UE 102 to the serving network 112, the server 116 receives a charge from the serving network 112 for aspects of the sponsored connectivity used by the UE 102. The server 116 then addresses the received charge according to one or more approaches as will be recognized by those skilled in the relevant art(s). As a result, the UE 102 is able to access the service, via the serving network 112, with the application service provider sponsoring (e.g., covering some or all of the cost for the specific access) the connection of the UE 102 with the serving network 112.

Figure 7C:
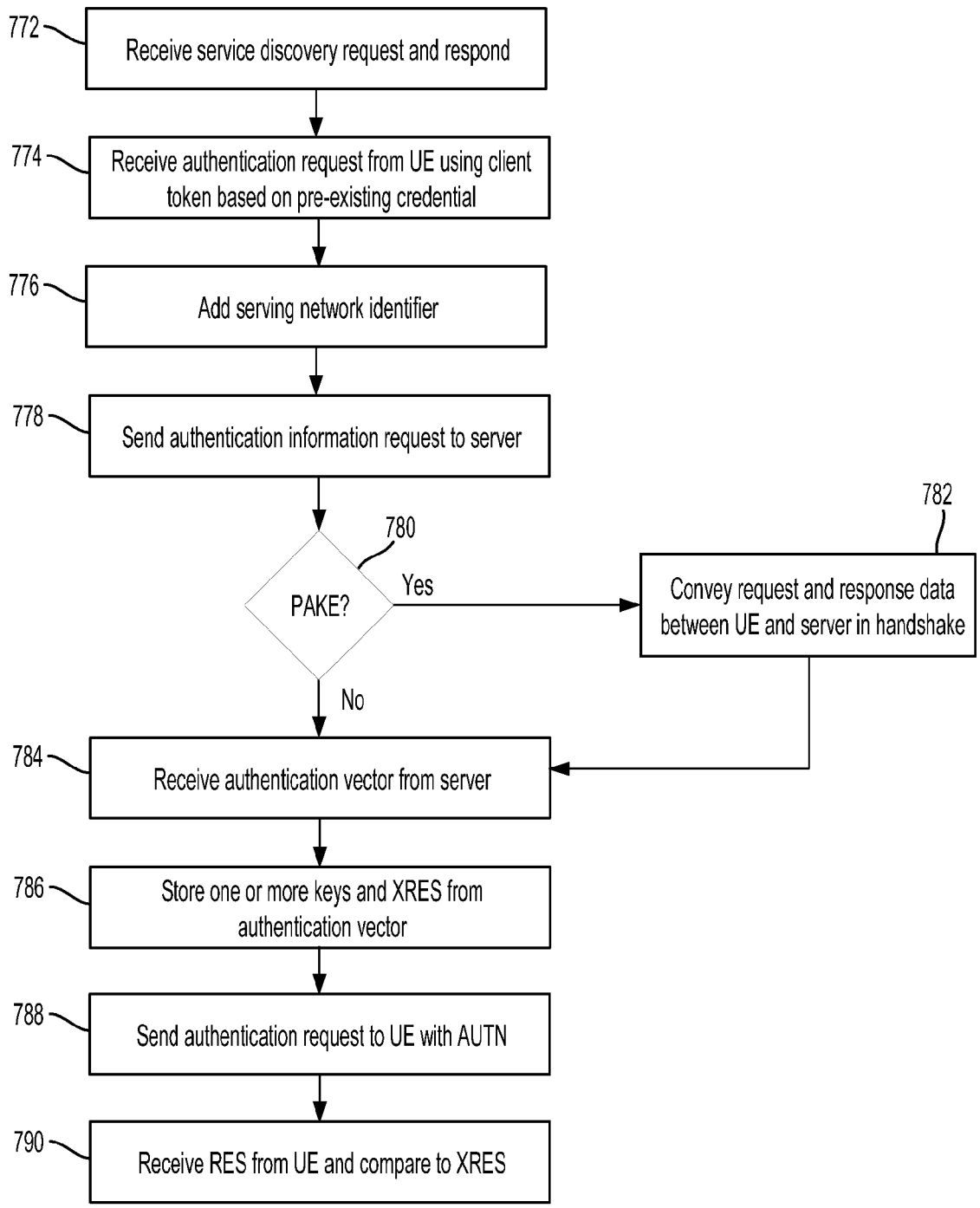
FIG. 7C is a flowchart illustrating an exemplary method for facilitating network access for a service sponsored by a server in accordance with various aspects of the present disclosure.

FIG. 7C is a flowchart illustrating an exemplary method 770 for facilitating network access for a sponsored service in accordance with various aspects of the present disclosure. The method 770 may be implemented in the MME 106 (and/or other network elements of the serving network 112).

The method 770 will be described with respect to the MME 106 for simplicity of discussion, though it will be recognized that the aspects described herein may be applicable to one or more other network elements in the serving network 112. It is understood that additional steps can be provided before, during, and after the steps of method 770, and that some of the steps described can be re-ordered, replaced, or eliminated for other embodiments of the method 770.

At step 772, the MME 106 receives a service discovery request from the UE 102 and responds. For example, the MME 106 may have caused network elements such as one or more eNBs to broadcast the connectivity sponsored by the application service provider hosted by the server 116. The service discovery request may be an attempt by the UE 102 to confirm the existence of the sponsored connectivity and/or the availability of the serving network 112 at that time.

At step 774, the MME 106 receives an attach request from the UE 102. The attach request includes in it a client token that is based on a pre-existing credential established previously between the UE 102 (and/or user of the UE 102) and the application service provider hosted by the server 116 instead of other traditional identifiers, such as IMSI.

At step 776, the MME 106 adds a serving network identifier to the attach request that corresponds to the serving network 112, and formulates an authentication request for forwarding on to the server 116. In addition, the MME 106 may establish a secure connection (e.g., TLS or HTTPS) to the server 116 to transmit the authentication request to the server 116.

At step 778, the MME 106 sends the authentication request to the server 116, e.g. via the secure connection established at step 776.

If the server 116 and the UE 102 are set up for PAKE, then at decision step 780 the method 770 proceeds to step 782.

At step 782, the MME 106 conveys request and response messages between the server 116 and the UE 102 during a handshake (e.g., four-way) between the server 116 and the UE 102 (or other level of handshake). The MME 106 conveys the request/response messages until the server 116 and the UE 102 agree upon a shared secret key.

At step 784, after the shared secret key has been agreed upon, the MME 106 receives an authentication vector from the server 116. The authentication vector may include $K_{ASME}$, AUTN, a random number RAND, and XRES.

Returning to decision step 780, if the UE 102 and the server 116 are not set up for PAKE, then the method 770 proceeds to step 784 as already described.

At step 786, the MME 106 extracts $K_{ASME}$ and XRES for use in mutual authentication with the UE 102 from the authentication vector received at step 784.

At step 788, the MME 106 sends an authentication request to the UE 102 that includes the AUTN and RAND values. The UE 102 validates AUTN based on the shared secret key with the server 116 (where PAKE was used) or the pre-existing credential and determines a response RES. For example, the UE 102 determines its own version of AUTN based on the shared secret key and compares to the AUTN received from the MME 106. If the values do not match, then the UE 102 cannot validate AUTN and authentication fails. If there is a match, then AUTN is validated.

At step 790, the MME 106 receives the RES from the UE 102 and compares it to the XRES that the MME 106 has stored at step 786. If the RES from the UE 102 matches the XRES from the server 116 at the MME 106, then the authentication has been successful and the process may then proceed with NAS and AS key setup. As a result, the UE 102 may access the service, via the serving network 112, with the application service provider sponsoring (e.g., covering some or all of the cost for the specific access) the connection of the UE 102 with the serving network 112. This is true even where the UE 102 does not have a SIM card or existing subscription with any home network/service provider.

Figure 8A:
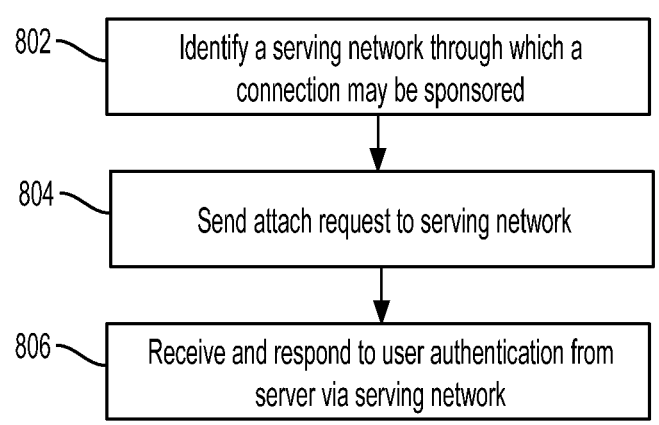
FIG. 8A is a flowchart illustrating an exemplary method for accessing a network for a service sponsored by a server in accordance with various aspects of the present disclosure.

FIG. 8A is a flowchart illustrating an exemplary method 800 for accessing a network for a service sponsored by an application service provider in accordance with various aspects of the present disclosure. The method 800 may be implemented in the UE 102. The method 800 will be described with respect to a single UE 102 for simplicity of discussion, though it will be recognized that aspects described herein may be applicable to a plurality of UEs 102. Further, as mentioned with respect to FIG. 6 above, the authorization server 120 and the server 116 may be the same or different entities. For simplicity of discussion, the following will make reference to the server 116 while discussing aspects related to the authorization server 120. It is understood that additional steps can be provided before, during, and after the steps of method 800, and that some of the steps described can be re-ordered, replaced, or eliminated for other embodiments of the method 800.

At step 802, the UE 102 identifies one or more serving networks 112 through which a sponsored connection may be available, for example as described above with respect to step 702 of FIG. 7A.

At step 804, the UE 102 sends an attach request to the serving network 112 in an attempt to take advantage of the sponsored connectivity. In contrast to step 710 of FIG. 7A, however, the UE 102 does not send a client token that is based on a pre-existing credential with the attach request (the UE 102 also does not send IMSI or another cellular credential). Instead, according to the embodiments of FIGS. 8A-8C, the UE 102 will rely on a user authentication and access authorization communication with the server 116 to assist in authenticating to the server 116. The MME 106 sends an authentication request to the server 116.

At step 806, in response to the authentication request the MME 106 sent, the UE 102 receives a user authentication and access authorization request from the server 116 via the serving network 112. The UE 102 responds to the request with the requisite information (e.g., by entering or providing a user name and/or password (in form of a pre-existing access credential for example) where or when requested) to the server 116. As was discussed with respect to FIG. 6 above and will be described further below in FIGS. 8B and 8C, the MME 106 receives an authorization code from the server 116 after the UE 102 and the server 116 complete user authentication/access authorization. The MME 106 uses this authorization code to request and receive an access token that the MME 106 is then able to use to request and receive user profile information from the server 116 that it uses to authenticate the UE 102 to the serving network 112 in order to take advantage of the sponsored connectivity.

Figure 8B:
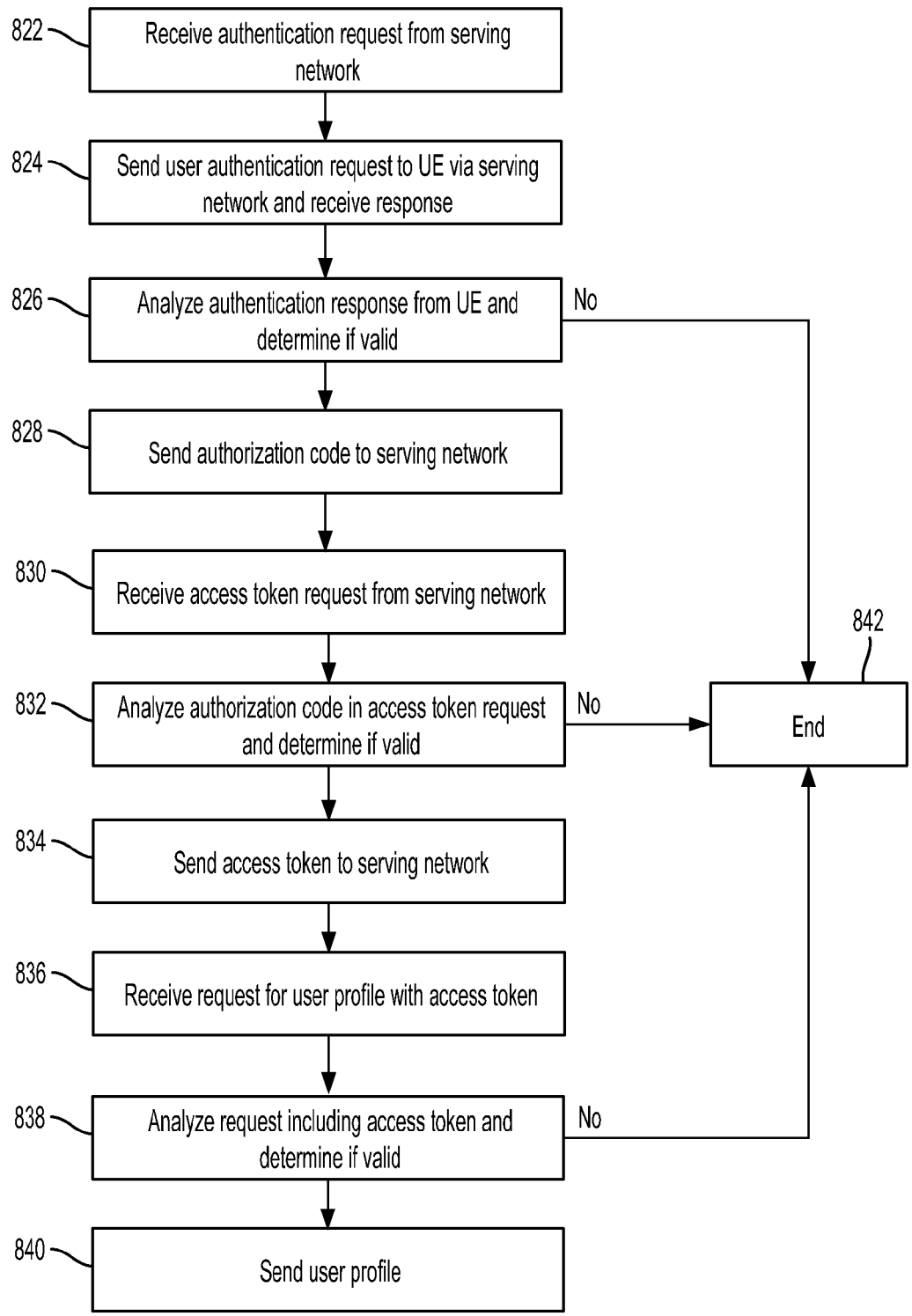
FIG. 8B is a flowchart illustrating an exemplary method for granting network access for a service sponsored by a server in accordance with various aspects of the present disclosure.

Turning now to FIG. 8B, a flowchart illustrates an exemplary method 820 for granting network access for a service sponsored by an application service provider in accordance with various aspects of the present disclosure. The method 820 may be implemented in the server 116 (which for purposes of this discussion describes the functionality of the authorization server 120 as well). It is understood that additional steps can be provided before, during, and after the steps of method 820, and that some of the steps described can be re-ordered, replaced, or eliminated for other embodiments of the method 820.

At step 822, the server 116 receives an authentication request from the serving network 112, for example from the MME 106 (which sent the request in response to an attach request from a UE 102).

At step 824, the server 116 initiates a request with the UE 102 via the serving network 112 to complete user authentication and access authorization with the UE 102. For example, the elements of the serving network 112 may convey the communications between the UE 102 and the server 116 during the user authentication and access authorization process, which may involve one or more requests and responses back and forth regarding a pre-existing credential between the UE 102 and the server 116 as described above with respect to action 606 of FIG. 6.

At step 826, the server 116 as part of the user authentication/access authorization process analyzes the responses from the UE 102 to determine whether the UE 102 has successfully authenticated (e.g., by providing proper user name and/or password credentials as compared to corresponding values stored in a profile stored at, or accessible by, the server 116). The server 116 further determines whether the UE 102 has completed access authorization (e.g., by providing permission or locating a previously-stored permission at the server 116 for the user associated with the UE 102). If user authentication and/or access authorization fails, then the method 820 proceeds to step 842, where the process ends (and the server 116 may send information to the UE 102 indicating why the process failed, such as incorrect user name/password combination and/or lack of permission given for the serving network 112 to access the user profile associated with the user of the UE 102).

If user authentication and access authorization are successful, the method 820 proceeds to step 828 where the server 116 sends an authorization code to the MME 106 (instead of, for example, to the UE 102 and then redirected back to the MME 106), for example as described above with respect to action 608 of FIG. 6.

At step 830, the server 116 receives a request from the MME 106, including the authorization code, for an access token.

At step 832, the server 116 analyzes the authorization code included with the token request from the MME 106. If there is a mismatch between the authorization code given to the MME 106 (which the server 116 kept stored) and the authorization code received from the MME 106 at step 830, then the request is denied and the method 820 proceeds to step 842, where the process ends (and the server 116 may send information to the UE 102 indicating why the process failed).

If successful, the method 820 proceeds to step 834 where the server 116 responds to the access token request with the requested access token to the MME 106, for example as described above with respect to action 612 of FIG. 6.

At step 836, the server 116 receives a request from the MME 106 for a user profile of the user of the UE 102 to attach the UE 102 to the serving network 112. The request for the user profile includes the access token that the MME 106 received from the server 116 as a result of step 834.

At step 838, the server 116 analyzes the request and the access token included to determine whether to release the requested information to the MME 106. If there is a mismatch between the access token given to the MME 106 and the access token received from the MME 106 at step 836, then the request is denied and the method 820 proceeds to step 842, where the process ends (and the server 116 may send information to the UE 102 indicating why the process failed).

If successful, at step 840 the server 116 sends the requested user profile to the MME 106. As a result, the UE 102 is able to attach to the serving network 112 without providing a pre-existing credential (e.g., password, hashed password, or access token previously stored at the UE 102, etc.) in the attach request to the MME 106, instead allowing the MME 106 to correspond with the server 116 to obtain the appropriate information.

Figure 8C:
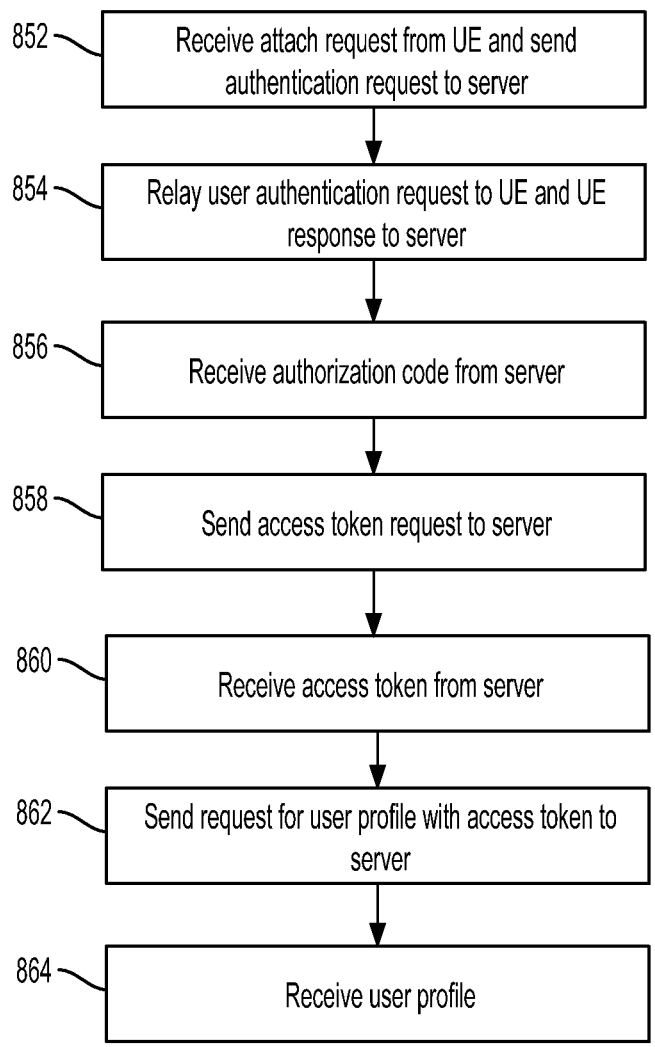
FIG. 8C is a flowchart illustrating an exemplary method for facilitating network access for a service sponsored by a server in accordance with various aspects of the present disclosure.

FIG. 8C is a flowchart illustrating an exemplary method 850 for facilitating network access for a service sponsored by an application service provider in accordance with various aspects of the present disclosure. The method 850 may be implemented in the MME 106 (and/or other network elements of the serving network 112). The method 850 will be described with respect to the MME 106 for simplicity of discussion, though it will be recognized that the aspects described herein may be applicable to one or more other network elements in the serving network 112. It is understood that additional steps can be provided before, during, and after the steps of method 850, and that some of the steps described can be re-ordered, replaced, or eliminated for other embodiments of the method 850.

At step 852, the MME 106 receives an attach request from a UE 102 (that does not include a client token that is based on a pre-existing credential or a subscriber identifier/cellular credential) and, in response, sends an authentication request to the server 116. The attach request includes information indicating that the UE 102 wishes to authenticate directly with the server 116, instead of providing the client token as part of an authentication request as at action 504 of FIG. 5 discussed above. The attach request may explicitly include an identifier that the MME 106 understands to indicate that the UE 102 needs to authenticate directly with the server 116, or this may be indirectly inferred by the MME 106 by virtue of the fact that the attach request lacks a client token.

At step 854, the MME 106 relays a user authentication/access authorization request to the UE 102 from the server 116 as well as the responses back to the server 116 from the UE 102 (which may include, for example, some form of pre-existing credential).

If the user authentication/access authorization is successful between the UE 102 and the server 116, at step 856 the MME 106 receives an authorization code from the server 116 that can be used to request an access token. The authorization code is sent to the MME 106 instead of, for example, the UE 102 and redirected back to the MME 106.

At step 858, the MME 106 sends a request for an access token to the server 116 in order to gain access to the user profile associated with the UE 102 from the server 116. As part of the request, the MME 106 includes the authorization code received at step 856.

At step 860, the MME 106 receives the requested access token after the server 116 authenticates the MME 106 and validates the authorization code provided by the MME 106.

At step 862, the MME 106 sends a request for the user profile associated with the user of the UE 102 so that the MME 106 may assist the serving network 112 in completing the attach of the UE 102 so that it may utilize the connectivity sponsored by the application service provider hosted by the server 116.

At step 864, the MME 106 receives the requested user profile after the server 116 analyzes the request and the access token included in the request at step 862. As a result, the UE 102 to attach to the serving network 112 without providing a pre-existing credential (e.g., password, hashed password, or access token previously stored at the UE 102, etc.) in the attach request.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a user equipment (UE) for accessing a service comprising means for identifying a serving network through which an application service provider server sponsors access to the service; means for sending an attach request to the serving network with a client token based on a pre-existing credential established with the application service provider server, the client token being unrecognizable as a cellular access credential to the serving network; and means for authenticating to the serving network via the application service provider server for sponsored access to the service based on the pre-existing credential.

The UE further includes means for including, in the attach request, an identification of authentication type used by the UE for authentication to utilize the sponsored access to the service. The UE further includes means for including, in the attach request, information identifying how to locate the application service provider server. The UE further includes wherein the pre-existing credential is based on a password established with the application service provider server generated via an out-of-band channel, further comprising means for including, with the attach request, a user name associated with the password and the application service provider server; means for hashing the password with a first value to generate the pre-existing credential; and means for hashing the pre-existing credential with a second value to generate the client token that is sent from the UE in the attach request. The UE further includes means for receiving, at the UE, an authentication token from the application service provider server via the serving network, wherein the serving network stores a key determined by the application service provider server based on the pre-existing credential; means for validating the authentication token; and means for determining, in response to the validation, a UE-based key based on the intermediate password credential generated by the UE. The UE further includes wherein the client token is included as a proof of the pre-existing credential, and wherein the pre-existing credential is established between the UE and the application service provider server prior to the sending the attach request. The UE further includes means for performing, after the sending, a handshake between the UE and the application service provider server to agree upon a shared secret key; means for determining a base key based on the shared secret key that is valid for a duration of an authentication session between the UE and the application service provider server; and means for validating authentication information received in response to the attach request after the handshake based on the base key. The UE further includes means for receiving an advertisement of the sponsored access from the serving network. The UE further includes means for authorizing a network element from the serving network to retrieve, from the application service provider server, a user profile associated with the pre-existing credential. The UE further includes wherein the UE operates without a subscriber identity module (SIM) card.

Embodiments of the present disclosure further include an application service provider server that sponsors access to a service comprising means for receiving, from an intervening serving network through which the application service provider server sponsors access to the service, an authentication information request based on an attach request from a user equipment (UE), the authentication information request comprising a client token based on a pre-existing credential established with the application service provider server and being unrecognizable as a cellular access credential to the serving network; means for determining authentication information based on the pre-existing credential accessible by the application service provider server in response to the authentication information request; and means for transmitting the authentication information in a response to the serving network, wherein the authentication information assists in authentication between the UE and the serving network for sponsored access to the service based on the pre-existing credential.

The application service provider further includes wherein the pre-existing credential is based on a password established with the application service provider server generated via an out-of-band channel and the authentication information request includes a user name associated with the password and the application service provider server, further comprising means for verifying the user name and client token based on one or more records accessible by the application service provider server, wherein the client token comprises the pre-existing credential hashed with a first value and the pre-existing credential comprises the password hashed with a second value. The application service provider further includes means for generating an authentication vector comprising a shared key, authentication token, and expected response based on the pre-existing credential. The application service provider further includes means for providing the client token to the UE for the UE to use as proof of possessing the pre-existing credential prior to receiving the authentication information request. The application service provider further includes means for agreeing, after the receiving, upon a shared secret key based on a handshake between the UE and the application service provider server; means for determining a base key based on the shared secret key; and means for generating an authentication vector comprising the base key, an authentication token, and an expected response based on the pre-existing credential. The application service provider further includes means for providing a user profile associated with the pre-existing credential to a network element from the serving network based on a UE authorization for the network element to access the user profile on behalf of the UE. The application service provider further includes means for establishing a service-level agreement between the application service provider server and the serving network, wherein in response to the service-level agreement the serving network advertises the sponsored access to available devices. The application service provider further includes wherein the UE completes authentication between the UE and the serving network and utilizes the sponsored access, further comprising means for receiving, from the serving network, a charge associated with the sponsored access to the service by the UE on the serving network. The application service provider further includes means for providing, prior to receiving the authentication information request, a list of trusted serving networks to the UE. The application service provider further includes wherein the intervening serving network comprises an evolved packet core (EPC) network and the application service provider server is part of a data network external to the EPC network.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for accessing a service, comprising:
   identifying, by a user equipment (UE), a network through which an application service provider server enables access to the service;
   sending, from the UE, an attach request to the network with a client token based on a pre-existing credential associated with the UE and established with the application service provider server, the client token being unrecognizable as a cellular access credential to the network; and
   authenticating, by the UE, to the network via the application service provider server for sponsored access to the service based on the pre-existing credential.

2. The method of claim 1, further comprising:
   including, by the UE in the attach request, an identification of authentication type used by the UE for authentication to utilize the sponsored access to the service,
   wherein the sending further comprises including, by the UE in the attach request, information identifying how to locate the application service provider.

3. The method of claim 1, wherein the pre-existing credential is based on a password established with the application service provider server generated via an out-of-band channel, the sending further comprising:
   including, by the UE with the attach request, a user name associated with the password and the application service provider server;
   hashing, by the UE, the password with a first value to generate the pre-existing credential; and
   hashing, by the UE, the pre-existing credential with a second value to generate the client token that is sent from the UE in the attach request.

4. The method of claim 3, further comprising:
   receiving, at the UE, an authentication token from the application service provider server via the network, wherein the network stores authentication information comprising a session key determined by the application service provider server based on the pre-existing credential, the session key enabling the network to authenticate with the UE;
   validating, by the UE, the authentication token; and
   in response to the validation, determining by the UE a UE-based key based on the pre-existing credential generated by the UE.

5. The method of claim 1, wherein the sending further comprises:
   including, by the UE, the client token as a proof of possessing the pre-existing credential, wherein the pre-existing credential is established between the UE and the application service provider server prior to the sending the attach request.

6. The method of claim 1, further comprising:
   performing, by the UE after the sending, a handshake between the UE and the application service provider server to agree upon a shared secret key;
   determining, by the UE, a base key based on the shared secret key that is valid for a duration of an authentication session between the UE and the application service provider server; and
   validating, by the UE, authentication information received in response to the attach request after the handshake based on the base key.

7. The method of claim 1, wherein the identifying further comprises:
   receiving, by the UE, an advertisement of the sponsored access from the network.

8. The method of claim 1, further comprising:
   authorizing, by the UE, a network element from the network to retrieve, from the application service provider server, a user profile associated with the pre-existing credential.

9. The method of claim 1, wherein the UE at least one of:
   lacks a subscription to a cellular service provider; and
   operates without a subscriber identity module (SIM) card.

10. A user equipment (UE) for accessing a service, comprising:
    a transceiver configured to:
    assist in identifying a network through which an application service provider server enables access to the service; and
    send an attach request to the network with a client token based on a pre-existing credential associated with the UE and established with the application service provider server, the client token being unrecognizable as a cellular access credential to the network; and a processor configured to authenticate to the network via the application service provider server for sponsored access to the service based on the pre-existing credential.

11. The user equipment of claim 10, wherein the processor is further configured to:
include, in the attach request, an identification of authentication type used by the UE for authentication to utilize the sponsored access to the service; and
include, in the attach request, information identifying how to locate the application service provider.

12. The user equipment of claim 10, wherein the pre-existing credential is based on a password established with the application service provider server generated via an out-of-band channel, the processor being further configured to:
include, with the attach request, a user name associated with the password and the application service provider server;
hash the password with a first value to generate the pre-existing credential; and
hash the pre-existing credential with a second value to generate the client token that is sent from the UE in the attach request.

13. The user equipment of claim 12, wherein:
the transceiver is further configured to receive an authentication token from the application service provider server via the network, wherein the network stores authentication information comprising a session key determined by the application service provider server based on the pre-existing credential, the session key enabling the network to authenticate with the UE; and
the processor is further configured to validate the authentication token and, in response to the validation, determine a UE-based key based on the pre-existing credential generated by the UE.

14. The user equipment of claim 10, wherein:
the client token represents a proof of possessing the pre-existing credential, and
the pre-existing credential is established between the UE and the application service provider server prior to sending the attach request.

15. The user equipment of claim 10, wherein:
the transceiver is further configured to perform, after sending the attach request, a handshake between the UE and the application service provider server to agree upon a shared secret key; and
the processor is further configured to determine a base key based on the shared secret key, that is valid for a duration of an authentication session between the UE and the application service provider server, and validate authentication information received in response to the attach request after the handshake based on the base key.

16. The user equipment of claim 10, wherein the transceiver is further configured to receive an advertisement of the sponsored access from the network.

17. The user equipment of claim 10, wherein the processor is further configured to:
authorize a network element from the network to retrieve, from the application service provider server, a user profile associated with the pre-existing credential.

18. The user equipment of claim 10, wherein the UE operates without a subscriber identity module (SIM) card.

19. A non-transitory computer-readable medium having program code recorded thereon, the program code comprising:
code for causing a user equipment (UE) to identify a network through which an application service provider server enables access to a service;
code for causing the UE to send an attach request to the network with a client token based on a pre-existing credential associated with the UE and established with the application service provider server, the client token being unrecognizable as a cellular access credential to the network; and
code for causing the UE to authenticate to the network via the application service provider server for sponsored access to the service based on the pre-existing credential.

20. The computer-readable medium of claim 19, further comprising:
code for causing the UE to include, in the attach request, an identification of authentication type used by the UE for authentication to utilize the sponsored access to the service; and
code for causing the UE to include, in the attach request, information identifying how to locate the application service provider server.

21. The computer-readable medium of claim 19, wherein the pre-existing credential is based on a password established with the application service provider server generated via an out-of-band channel, the computer-readable medium further comprising:
code for causing the UE to include, with the attach request, a user name associated with the password and the application service provider server;
code for causing the UE to hash the password with a first value to generate the pre-existing credential; and
code for causing the UE to hash the pre-existing credential with a second value to generate the client token that is sent from the UE in the attach request.

22. The computer-readable medium of claim 21, further comprising:
code for causing the UE to receive an authentication token from the application service provider server via the network, wherein the network stores authentication information comprising a session key determined by the application service provider server based on the pre-existing credential, the session key enabling the network to authenticate with the UE;
code for causing the UE to validate the authentication token; and
code for causing the UE, in response to the validation, to determine a UE-based key based on the pre-existing credential generated by the UE.

23. The computer-readable medium of claim 19, further comprising:
code for causing the UE to include the client token as a proof of possessing the pre-existing credential, wherein the pre-existing credential is established between the UE and the application service provider server prior to the sending the attach request.

24. The computer-readable medium of claim 19, further comprising:
code for causing the UE to perform, after the sending, a handshake between the UE and the application service provider server to agree upon a shared secret key;
code for causing the UE to determine a base key based on the shared secret key that is valid for a duration of an authentication session between the UE and the application service provider server; and code for causing the UE to validate authentication information received in response to the attach request after the handshake based on the base key.

25. The computer-readable medium of claim 19, further comprising:

code for causing the UE to receive an advertisement of the sponsored access from the network.

26. The computer-readable medium of claim 19, further comprising:

code for causing the UE to authorize a network element from the network to retrieve, from the application service provider server, a user profile associated with the pre-existing credential.

27. The computer-readable medium of claim 19, wherein the UE operates without a subscriber identity module (SIM) card.

* * * * *